United States Patent
Xiong et al.

(10) Patent No.: US 10,952,299 B1
(45) Date of Patent: Mar. 16, 2021

(54) POWER CONTROL METHOD DURING INPUT LINE VOLTAGE FLUCTUATION

(71) Applicant: UNIVERSAL LIGHTING TECHNOLOGIES, INC., Madison, AL (US)

(72) Inventors: Wei Xiong, Madison, AL (US); Scott Price, Madison, AL (US)

(73) Assignee: Universal Lighting Technologies, Inc., Madison, AL (US)

(*) Notice: Subject to any disclaimer, the term of this patent is extended or adjusted under 35 U.S.C. 154(b) by 0 days.

(21) Appl. No.: 16/804,091

(22) Filed: Feb. 28, 2020

Related U.S. Application Data

(60) Provisional application No. 62/832,358, filed on Apr. 11, 2019.

(51) Int. Cl.
| | |
|---|---|
| H05B 45/305 | (2020.01) |
| H05B 45/385 | (2020.01) |
| H05B 45/382 | (2020.01) |
| H02M 3/335 | (2006.01) |
| H02M 1/00 | (2006.01) |

(52) U.S. Cl.
CPC ............ *H05B 45/382* (2020.01); *H02M 1/00* (2013.01); *H02M 3/33569* (2013.01); *H05B 45/305* (2020.01); *H02M 2001/0009* (2013.01)

(58) Field of Classification Search
CPC ...... H05B 45/12; H05B 45/14; H05B 45/305; H05B 45/385; H05B 45/39
USPC ................ 315/224, 225, 226, 247, 291, 307
See application file for complete search history.

(56) References Cited

U.S. PATENT DOCUMENTS

| | | | |
|---|---|---|---|
| 4,349,752 | A | 9/1982 | Forte |
| 5,696,431 | A | 12/1997 | Giannopoulos et al. |
| 5,864,472 | A | 1/1999 | Peterson |
| 7,595,969 | B2 | 9/2009 | Oba |
| 8,057,652 | B2 | 11/2011 | Routbort et al. |
| 9,112,415 | B2 | 8/2015 | Grakist et al. |
| 9,237,613 | B1* | 1/2016 | Xiong .............. H05B 45/10 |
| 9,837,913 | B1 | 12/2017 | Xiong |
| 10,098,194 | B1 | 10/2018 | Xiong |

(Continued)

OTHER PUBLICATIONS

International Rectifier, IRS27951S, IRS27952(4)S, Aug. 27, 2015, pp. 10-9 (2015).

*Primary Examiner* — Henry Luong
(74) *Attorney, Agent, or Firm* — Patterson Intellectual Property Law, P.C.; Gary L. Montle; Alex H. Huffstutter

(57) ABSTRACT

A resonant power converter as disclosed herein, e.g., an LED driver, comprises first and second switches in a half-bridge arrangement and responsive at an operating frequency to controlled drive signals. A resonant circuit is coupled between the switch output and an isolation transformer. A negative feedback control loop provides an error signal for regulation of the output current. A reference control circuit is added to the feedback control loop, and configured to sense when the error signal exceeds a threshold value, and further configured in response to control a feedback reference signal wherein the error signal is reset to a value below the threshold value. By resetting the feedback control reference value, loop runaway may be prevented, e.g., for enough time that the LED load may warm up or otherwise stabilize. As a result the LED driver will always maintain negative current closed loop control, and restore normal operating mode.

19 Claims, 11 Drawing Sheets

(56) References Cited

U.S. PATENT DOCUMENTS

| | | |
|---|---|---|
| 10,243,473 B1 | 3/2019 | Xiong et al. |
| 10,476,399 B1 | 11/2019 | Xiong |
| 2004/0160794 A1 | 8/2004 | Lin |
| 2010/0277957 A1 | 11/2010 | Chueh et al. |
| 2012/0153858 A1 | 6/2012 | Melanson et al. |
| 2013/0099788 A1 | 4/2013 | Xu et al. |
| 2013/0271021 A1 | 10/2013 | Elferich |
| 2014/0091720 A1 | 4/2014 | Brinlee |
| 2014/0167640 A1 | 6/2014 | Knoedgen |
| 2014/0252981 A1 | 9/2014 | Xie et al. |
| 2015/0103562 A1 | 4/2015 | Yeh et al. |
| 2015/0257222 A1 | 9/2015 | Siessegger et al. |
| 2016/0014858 A1 | 1/2016 | Ramabhadran et al. |
| 2016/0057825 A1 | 2/2016 | Hu et al. |
| 2016/0073457 A1 | 3/2016 | Nakajo |
| 2016/0190945 A1 | 6/2016 | Liu et al. |
| 2016/0276936 A1 | 9/2016 | Gritti |
| 2017/0093296 A1* | 3/2017 | Chen ............... H02M 3/33546 |
| 2017/0179831 A1 | 6/2017 | Yu et al. |
| 2017/0187298 A1 | 6/2017 | Lin |
| 2017/0222565 A1 | 8/2017 | Sonobe |
| 2018/0153020 A1 | 5/2018 | Sun et al. |
| 2018/0234019 A1 | 8/2018 | Chen |
| 2018/0262118 A1 | 9/2018 | Ouyang |

\* cited by examiner

POWER CONTROL METHOD DURING INPUT LINE VOLTAGE FLUCTUATION

CROSS-REFERENCES TO RELATED APPLICATIONS

This application claims benefit under 35 USC. § 119(e) of U.S. Provisional Patent Application No. 62/832,358, filed Apr. 11, 2019, entitled "Power Control Method During Input Line Voltage Fluctuation," and the entirety of which is incorporated by reference herein.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present disclosure relates generally to power supplies that provide a DC voltage to a load, such as, for example, light-emitting diodes ("LED"s). More particularly, the present disclosure relates to an apparatus and method for regaining negative feedback control of a power supply after a temporary input voltage drop causes the power supply to transition from a normal mode to a frequency-clamp mode.

Constant-power tunable LED drivers are very popular in the lighting market because of their flexibility to drive different LED loads at different current levels. A single constant-power driver, for example, a 220-Watt constant-power LED driver can drive any load from 2-Amps at 110-Volts to 1.4-Amps at 157-Volts. The current provided by the driver is tunable using a programming tool.

One such constant-power tunable driver which may be used to drive an LED load is a half-bridge resonant type DC-DC converter. A half-bridge resonant type DC-DC converter is theoretically a very good candidate for driving an LED load because it has a high efficiency and a wide load range. When an operating frequency of the half-bridge resonant type DC-DC converter drops below a resonant frequency associated with the half-bridge resonant type DC-DC converter, the half-bridge resonant type DC-DC converter begins to operate in a frequency-clamped mode associated with a loss of negative feedback control. The half-bridge resonant type DC-DC converter has no way to automatically get from the frequency-clamped mode back to a normal operating mode. Although the half-bridge resonant type DC-DC converter can operate safely when in the frequency-clamped mode, it will have a much larger current ripple at its output than that associated with the normal operating mode. This much larger ripple current being delivered to the LED load may larger than the rated current of the LED load, and accordingly may damage the LED load.

BRIEF SUMMARY

In view of the problems referenced above, a need exists for resonant power converters (including but not limited to LED drivers) having circuitry which is configured to automatically help the power converter recover negative feedback control following loss thereof due to a temporary input voltage drop.

The present disclosure proposes a power control method and associated power control circuitry configured to execute the power control method. The proposed power control method can effectively bring back negative current feedback control following loss thereof due to a temporary input voltage drop and get the power driver out of a frequency-clamp mode. High level details of the proposed power control method and associated circuitry are described here. The power control circuitry uses the error signal output from a feedback circuit of the power driver as an indicator of loop run-away. The power control circuitry manipulates the reference current associated with the feedback circuit to reset the error signal produced by the feedback circuit in order to push the operating frequency to be greater than the resonant frequency of the power driver (e.g., where negative current control works). Finally, the power control circuitry is configured to continuously monitor the error signal produced by the feedback circuit and prevent the power driver from getting stuck at a minimum frequency less than the resonant frequency.

In one particular embodiment, a resonant power converter as disclosed herein comprises first and second switching elements coupled across a direct current (DC) power source. A resonant circuit is coupled between an isolation transformer primary winding and an output node between the first and second switching elements. A current sensing circuit is coupled in series with a load across a secondary winding of the isolation transformer, and provides a sensor output signal representative of an output current across the load. A feedback circuit generates an error signal corresponding to a difference between the sensor output signal and a reference signal. A controller generates drive signals to the first and second switching elements, and a frequency control circuit is coupled between the feedback circuit and a frequency control input terminal of the controller, wherein the frequency control circuit is configured, responsive to the error signal, to determine an operating frequency of the controller with respect to defined minimum and maximum frequencies. A reference control circuit is coupled between an output terminal of the feedback circuit and a reference signal input of the feedback circuit, wherein the reference control circuit senses when the error signal exceeds a threshold value, and in response controls the reference signal wherein the error signal is reset to a value below the threshold value.

In one exemplary aspect of the above-referenced embodiment, the reference control circuit includes a resistor, a capacitor, and a second controller. The error signal is fed to the second controller for monitoring through the resistor and is filtered by the capacitor.

In another exemplary aspect of the above-referenced embodiment, the resistor is coupled between the output terminal of the feedback circuit and an input of the second controller, the capacitor is coupled between the input of the second controller and a ground reference, and an output of the second controller is coupled to the reference signal input of the feedback circuit.

In another exemplary aspect of the above-referenced embodiment, the second controller is confirmed to wait for a first time period after sensing the error signal exceed the threshold value prior to controlling the reference signal, wherein the first controller stabilizes at a minimum operating frequency during the first time period.

In another exemplary aspect of the above-referenced embodiment, the second controller is configured to reduce the reference signal until the error signal is less than the threshold value and hold the reference signal at a corresponding reduced value for a second time period prior to increasing the reference signal back to an initial value.

In another exemplary aspect of the above-referenced embodiment, the error signal being less than the threshold value corresponds to an input voltage of the DC power source being normal, and the error signal being greater than or equal to the threshold value corresponds to a drop in the input voltage, the drop being large enough the cause the operating frequency of the first controller to be less than a resonant frequency of the first controller.

A particular embodiment of a method is also disclosed herein for a resonant power converter to recover from a frequency-clamp mode initiated by a temporary input voltage drop. The method includes monitoring an error signal at an output of a feedback circuit of the resonant power converter, and sensing when the error signal exceeds a threshold value associated with the temporary input voltage drop. A reference signal at an input of the feedback circuit is controlled in order to decrease the error signal below the threshold value.

Exemplary further steps of the above-referenced method include waiting for a first time period after the sensing that the error signal exceeds the threshold value prior to controlling the reference signal, and stabilizing the resonant power converter at a minimum frequency during the first time period.

In an exemplary aspect of the above-referenced method, the reference signal is reduced until the error signal is less than the threshold value.

In another exemplary aspect of the above-referenced method, the reference signal is maintained at a reduced value associated with the error signal being less than the threshold value for a second time period, and the reference signal is increased to an initial setpoint following the second time period.

In another exemplary aspect of the above-referenced method, each step is repeated until the input voltage increases back to a normal value.

In another exemplary aspect of the above-referenced method, the error signal is ignored during a startup sequence of the resonant power converter.

Another exemplary aspect of the above-referenced method includes selecting the threshold value less than a maximum saturated value associated with the feedback circuit and greater than a steady state error signal associated with a normal operating mode.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
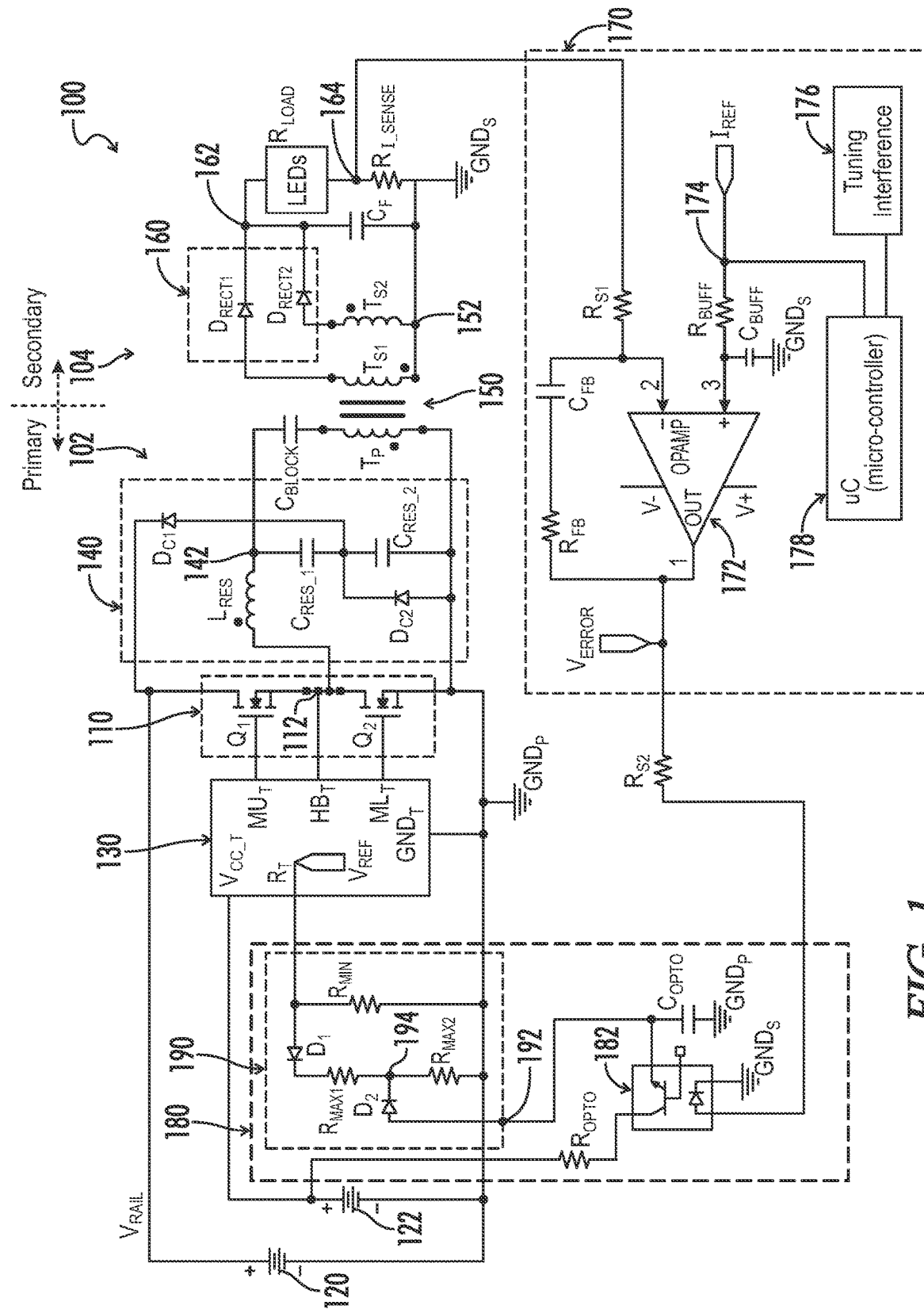
FIG. 1 is a circuit diagram representing an embodiment of a half-bridge resonant type DC-DC converter as disclosed herein.

Referring to FIG. 1, an embodiment of a half-bridge resonant type DC-DC converter 100 is further described herein. The half-bridge resonant type DC-DC converter 100 may also be referred to herein as a partially clamped resonant converter 100 or a tunable constant power LED driver.

The converter 100 includes a primary circuit 102 and a secondary circuit 104, which are electrically isolated as described below. The converter includes a first switch $Q_1$ and a second switch $Q_2$ in a half-bridge switching circuit 110. The switches may be, for example, metal oxide semiconductor field effect transistors (MOSFETs) or bipolar junction transistors (BJTs). In the illustrated embodiment, the two switches are n-channel MOSFETs. The half-bridge switching circuit is connected between a rail voltage $V_{RAIL}$ and a primary circuit ground reference $GND_P$. The rail voltage $V_{RAIL}$ may also be referred to herein as an output rail voltage $V_{RAIL}$ or a DC input bus $V_{RAIL}$. The rail voltage $V_{RAIL}$ may be considered as a first voltage rail; and the primary circuit ground reference may be considered as a second voltage rail. The drain of the first switch is connected to the DC input bus. The source of the first switch is connected to the drain of the second switch at a common switched node 112 of the half-bridge switching circuit. The source of the second switch is connected to the primary circuit ground reference.

In the illustrated embodiment, the voltage on the DC input bus 120 is provided by a first DC voltage source 120. In the illustrated embodiment, the first DC voltage source is illustrated as a battery; however, it should be understood that the voltage on the DC input bus may be provided by other sources, such as, for example, a power factor correction (PFC) stage, the DC output of a bridge rectifier, or the like, which are supplied from an AC source (not shown). The battery is representative of a variety of voltage sources that provide a substantially constant voltage on the DC input bus.

Each of the first switch $Q_1$ and the second switch $Q_2$ has a respective control input terminal. In the illustrated embodiment incorporating MOSFETs, the control input terminals are the gates of the two transistors. The control input terminals are driven by a self-oscillating half-bridge gate driver integrated circuit (IC) 130, which may also be referred to as a switch controller. In an illustrated embodiment, the driver IC (switch controller) 130 may be, for example, an NCP1392B high-voltage half-bridge driver with inbuilt oscillator, which is commercially available from ON Semiconductor Company of Phoenix, Ariz. The driver IC 130 is powered by a second DC voltage source 122 via an input terminal $V_{CC\_T}$ of the driver IC 130. In FIG. 1, the second DC voltage source is illustrated as a battery that provides a voltage $V_{CC}$; however, it should be understood that the second DC voltage source may also be derived from an AC source.

The driver IC (switch controller) 130 is responsive to a timing resistance connected to a timing terminal $R_T$ to alternately apply an upper drive voltage on an upper drive terminal $MU_T$ and apply a lower drive voltage to a lower drive terminal $ML_T$. The upper output drive voltage is applied to the control input terminal of the first switch $Q_1$. The lower output drive voltage is applied to the control input terminal of the second switch $Q_2$. When the resistance applied to the timing terminal $R_T$ of the driver IC 130 increases, the current flowing out of the timing terminal decreases, which causes the frequency of the drive voltages applied to the two switches to decrease. When the resistance applied to the timing terminal $R_T$ of the driver IC 130 decreases, the current flowing out of the timing terminal increases, which causes the frequency of the drive voltages to increase. A ground terminal $GND_T$ of the driver IC 130 is coupled to the primary circuit ground $GND_P$. The driver IC 130 may include other terminals that are not shown in FIG. 1.

The common switched node 112 of the half-bridge switching circuit 110 is connected to a half bridge connection terminal $HB_T$ of the driver IC 130. The first and second switches Q1, Q2 provide a high frequency AC voltage input to a resonant circuit 140. The resonant circuit 140 as configured in FIG. 1 may also be referred to herein as a partially clamped resonant circuit 140. The common switched node 112 is also connected to a first terminal of a resonant inductor $L_{RES}$ of the resonant circuit 140. A second terminal of the resonant inductor $L_{RES}$ is connected to a first terminal of a first resonant capacitor $C_{RES\_1}$ at an output node 142 in the resonant circuit 140. A second terminal of the first resonant capacitor $C_{RES\_1}$ is connected to a first terminal of a second resonant capacitor $C_{RES\_2}$. A second terminal of the second resonant capacitor $C_{RES\_2}$ is connected to the primary circuit ground reference $GND_P$. The voltage on the second resonant capacitor $C_{RES\_2}$ is clamped by a first clamping diode $D_{C1}$ and a second clamping diode $D_{C2}$. The cathode of the first clamping diode $D_{C1}$ is coupled to the rail voltage $V_{RAIL}$. The anode of the first clamping diode $D_{C1}$ is coupled to the second terminal of the resonant inductor $L_{RES}$. The cathode of the second clamping diode $D_{C2}$ is coupled to the second terminal of the resonant inductor $L_{RES}$. The anode of the second clamping diode $D_{C2}$ is coupled to the primary circuit ground reference $GND_P$. The first resonant capacitor $C_{RES\_1}$ is specifically designed so that the resonant circuit 140 will always have soft-switching within a certain frequency range (i.e., between a minimum frequency $f_{min}$ and a maximum frequency $f_{max}$).

The output node 142 of the resonant circuit 140 is connected to a first terminal of a DC blocking capacitor $C_{BLOCK}$. A second terminal of the DC blocking capacitor $C_B$ is connected to a first terminal of a primary winding $T_P$ of an output isolation transformer 150. A second terminal of the primary winding $T_P$ of the output isolation transformer 150 is connected to the primary circuit ground reference $GND_P$. The foregoing components on the primary circuit 102 of the half-bridge switching circuit 110 operate as a DC to AC inverter to produce an AC voltage across the primary winding $T_P$ of the output isolation transformer 150.

The output isolation transformer 150 includes a first secondary winding $T_{S1}$ and a second secondary winding $T_{S2}$. The two secondary windings $T_{S1}$, $T_{S2}$ are electrically isolated from the primary winding $T_P$. As illustrated, the primary winding $T_P$ is electrically part of the primary circuit 102, and the secondary windings $T_{S1}$, $T_{S2}$ are electrically part of the secondary circuit 104. The two secondary windings $T_{S1}$, $T_{S2}$ have respective first terminals, which are connected at a center tap 152. Respective second terminals of the first and second secondary windings $T_{S1}$, $T_{S2}$ are connected to input terminals of a half-bridge rectifier 160. The half-bridge rectifier 160 comprises a first rectifier diode $D_{RECT1}$ and a second rectifier diode $D_{RECT2}$. The second terminal of the first secondary winding $T_{S1}$ is connected to the anode of the first rectifier diode $D_{RECT1}$. The second terminal of the second secondary winding $T_{S2}$ is connected to the anode of the second rectifier diode $D_{RECT2}$. The cathodes of the two rectifier diodes are connected together at an output node 162 of the half-bridge rectifier 160. The center tap 152 of the first and second secondary windings $T_{S1}$, $T_{S2}$ is connected to a secondary circuit ground reference $GND_S$. In other embodiments having a single, non-center-tapped secondary winding (not shown), the half-bridge rectifier with the two rectifier diodes may be replaced with a full-bridge rectifier with four rectifier diodes.

The output node 162 of the half-bridge rectifier 160 is connected to a first terminal of an output filter capacitor CF. A second terminal of the output filter capacitor is connected to the secondary circuit ground reference $GND_S$. An output voltage ($V_{OUT}$) is developed across the output filter capacitor at the output node 162 of the half-bridge rectifier 160. The output node 162 of the half-bridge rectifier 160 is also connected to a first terminal of a load $R_{LOAD}$, which may comprise, for example, one or more light-emitting didoes (LEDs) that emit light when sufficient current passes through the LEDs. A second terminal of the load is connected to a current sensing node 164 and to the first terminal of a current sensing resistor $R_{I\_SENSE}$. A second terminal of the current sensing resistor $R_{I\_SENSE}$ is connected to the secondary circuit ground reference $GND_S$. When current flows through the load $R_{LOAD}$, the same current flows through the current sensing resistor $R_{I\_SENSE}$. Accordingly, a voltage develops on the current sensing node 164 that has a magnitude with respect to the secondary circuit ground reference $GND_S$ that is proportional to the current flowing through the load $R_{LOAD}$. In one embodiment, the current sensing resistor $R_{I\_SENSE}$ has a resistance of, for example, 0.1 ohm such that the effect of the resistance of the current sensing resistor $R_{I\_SENSE}$ on the load current is insignificant.

When the driver IC 130 operates to apply alternating drive voltages to the first switch $Q_1$ and the second switch $Q_2$, an AC voltage develops across the first and second resonant capacitors $C_{RES1}$, $C_{RES2}$ (or is it only across the second resonant capacitor?). The voltage across the first and second resonant capacitors $C_{RES1}$, $C_{RES2}$ may include a DC component; however, the DC blocking capacitor $C_{BLOCK}$ transfers only the AC component of the energy stored in the first and second resonant capacitors $C_{RES1}$, $C_{RES2}$ to the primary winding $T_P$ of the output isolation transformer 150. The transferred energy is magnetically coupled from the primary winding $T_P$ to the electrically isolated first and second secondary windings $T_{S1}$, $T_{S2}$. The first and second rectifier diodes $D_{RECT1}$, $D_{RECT2}$ in the half-bridge rectifier 160 rectify the AC energy from the first and second secondary windings $T_{S1}$, $T_{S2}$ into DC energy, which is provided on the output node 162. The DC energy is stored in the output filter capacitor CF at a voltage determined by the amount of stored energy. Current from the output filter capacitor CF is provided to the load $R_{LOAD}$ at a magnitude determined by the voltage on the half-bridge rectifier output node and the resistance of the load.

Because the intensity of the light emitted by the LEDs in the load $R_{LOAD}$ is dependent on the magnitude of the current flowing through the LEDs, the current is controlled closely. The current sensing resistor $R_{I\_SENSE}$ senses the current $I_{LOAD}$ going through the load $R_{LOAD}$ and develops a sensor voltage $V_{I\_SENSE}$ on the current sensing node 164 proportional to the load current $I_{LOAD}$. The sensor voltage $V_{I\_SENSE}$ may also be referred to herein as a sensor output signal. The sensor voltage $V_{I\_SENSE}$ representing the sensed current $I_{SENSE}$ is fed back to a feedback circuit 170 to provide current regulation.

The feedback circuit 170 is configured to regulate the output current $I_{LOAD}$ through the load $R_{LOAD}$ at a reference current $I_{REF}$. The reference current $I_{REF}$ may also be referred to herein as a reference signal $I_{REF}$. The output current $I_{LOAD}$ can also be referred to herein as a load current $I_{LOAD}$. The feedback circuit 170 includes an operational amplifier (OPAMP) 172 having an inverting (−) input terminal, having a non-inverting (+) input terminal, and having an output (OUT) on an output terminal. The current sensing node 164 is connected to the inverting input of the OPAMP 172 via a first series resistor $R_{S1}$. A feedback resistor $R_{FB}$ and a feedback capacitor $C_{FB}$ are connected in series between the output terminal of the OPAMP 172 and the inverting input. The feedback resistor $R_{FB}$ may also be referred to herein as a gain control resistor. The feedback capacitor $C_{FB}$ may also be referred to herein as an integration capacitor. The first series resistor $R_{S1}$ and the feedback resistor $R_{FB}$ determine the proportional gain of the feedback circuit 170. The first series resistor $R_{S1}$ and the feedback capacitor $C_{FB}$ determine the crossover frequency of the feedback circuit 170.

The reference current $I_{REF}$ is connected to the non-inverting input of the OPAMP 172 via a buffer resistor $R_{BUFF}$ and a buffer capacitor $C_{BUFF}$. The buffer resistor $R_{BUFF}$ and the buffer capacitor $C_{BUFF}$ are used to buffer the reference current $I_{REF}$. The buffer resistor $R_{BUFF}$ is connected between a reference current node 174 where at the reference current $I_{REF}$ is received and the non-inverting input of the OPAMP 172. The buffer capacitor $C_{BUFF}$ is connected between the non-inverting input of the OPAMP 172 and the secondary circuit ground reference $GND_S$. The reference current $I_{REF}$ is transmitted through the buffer resistor and is used to charge up a voltage $V_{C\_BUFF}$ across the buffer capacitor $C_{BUFF}$, which is sensed or received by the non-inverting input of the OPAMP 172. The voltage $V_{C\_BUFF}$ may also be referred to herein as a current control voltage $V_{C\_BUFF}$.

The magnitude of the reference current $I_{REF}$ is selected to produce a desired load current $I_{LOAD}$ through the load $R_{LOAD}$. The reference current $I_{REF}$ may be a fixed reference current to provide a constant load current. A tuning interface 176, such as, for example, a dimmer, can be provided for adjusting the magnitude of the reference current $I_{REF}$ whenever is necessary to drive a specific load. A micro-controller 178 may be used to receive a tuning signal from the tuning interface 176 and to control the reference current $I_{REF}$ at the reference current node 174. If the reference current $I_{REF}$ changes to a new magnitude, the load current $I_{LOAD}$ is adjusted and maintained constant relative to the new magnitude. The OPAMP 172 is responsive to a difference in the magnitudes of the reference current $I_{REF}$ and the sensor voltage $V_{I\_SENSE}$ at the current sensing node 164 to generate an error signal $V_{ERROR}$. The error signal $V_{ERROR}$ is used to control the operating frequency $f_{op}$ of the driver IC 130 as described below. The OPAMP 172 may also be considered as a comparator because the OPAMP 172 compares the magnitudes of the two input signals and generates an output signal having a magnitude responsive to a difference between the magnitudes of the two input signals.

During operation of the OPAMP 172, when the output current $I_{LOAD}$ is lower than the reference current $I_{REF}$ the error signal $V_{ERROR}$ at the output terminal will increase. When the output current $I_{LOAD}$ is greater than the reference current $I_{REF}$ the error signal $V_{ERROR}$ at the output terminal will decrease. The error signal $V_{ERROR}$ is fed to a current control circuit 180 to achieve closed loop frequency control in order to maintain a constant output current when the load $R_{LOAD}$ changes.

The output terminal of the OPAMP 172 is connected to the input stage of an optocoupler 182 of the current control circuit 180 via a second series resistor $R_{S2}$. The optocoupler 182 may also be referred to herein as an opto isolator, or an optical isolator. The input stage of the optocoupler 182 has an internal light generation device (e.g., an LED) coupled to the input of the optocoupler. The light generation device is responsive to a voltage (e.g., the error signal $V_{ERROR}$) applied to the input stage to generate light. The applied voltage is referenced to the secondary circuit ground reference $GND_S$ to which the light generation stage is connected. The generated light is propagated internally to a light-responsive base of a phototransistor in an output stage within the same component. The phototransistor has an emitter and a collector. The emitter is connected to the primary circuit ground reference $GND_P$ through an optocoupler capacitor $C_{OPTO}$. The impedance of the phototransistor between the collector and the emitter in the output stage of the optocoupler is responsive to the light generated by the input stage. Thus, the impedance of the output stage is responsive to the voltage applied to the input stage. In the illustrated embodiment, increasing the voltage applied to the input stage decreases the impedance of the output stage, and decreasing the voltage applied to the input stage increases the impedance of the output stage. The optocoupler electrically isolates the secondary circuit voltages and the secondary circuit ground reference $GND_S$ in the secondary circuit 104 from the primary circuit voltages and the primary circuit ground reference $GND_P$ in the primary circuit 102.

The collector of the phototransistor in the output stage of the optocoupler 182 is connected to the second DC voltage source 122 through an optocoupler resistor $R_{OPTO}$.

The emitter of the phototransistor of the output stage of the optocoupler 182 is further connected to an input node 192 of a frequency control block 190 of the current control circuit 180. The frequency control block 190 includes a minimum frequency resistor $R_{MIN}$ coupled between the timing terminal $R_T$ of the driver IC 130 and the primary circuit ground reference $GND_P$. The frequency control block 190 further includes a first diode $D_1$, second diode $D_2$, a first maximum frequency resistor $R_{MAX1}$, and a second maximum frequency resistor $R_{MAX2}$. An anode of the first diode $D_1$ is coupled to the timing terminal $R_T$ of the driver IC 130. The first and second maximum frequency resistors $R_{MAX1}$, $R_{MAX2}$ are coupled in series between a cathode of the first diode $D_1$ and the primary circuit ground reference $GND_P$. A node 194 defined between the first and second maximum frequency resistors is coupled to a cathode of the second diode $D_2$ of the frequency control block. An anode of the second diode $D_2$ is coupled to the input node 192 of the frequency control block.

The current control circuit 180 receives the error signal $V_{ERROR}$ from the feedback circuit 170 and adjusts the operating frequency $f_{op}$ of the driver IC 130. As used herein, the combination of the feedback circuit 170 and the current control circuit 180 may be referred to as a control loop or a current control loop of the converter 100. The frequency control driver IC is directly proportional to the current that flows out the timing terminal $R_T$ of the driver IC 130, which is internally connected to a reference voltage $V_{REF}$. The operating frequency $f_{op}$ follows the equation:

$$f_{op} = I_{R_T} \cdot 250 \text{ (KHz/mA)} = \frac{V_{REF}}{R_{TOTAL}} \cdot 250 \text{ (KHz/mA)} \quad (1)$$

$R_{TOTAL}$ is the total resistance connected to the timing terminal Rt.

Before the feedback circuit 170 starts working, the error signal $V_{ERROR}$ is zero. Accordingly, the second diode $D_2$ doesn't conduct any current and the emitter of the optocoupler 182 is open. As a result, there is no voltage across the optocoupler capacitor $C_{OPTO}$ which causes the second diode $D_2$ to be negatively biased and thus not conduct any current. This is when the maximum frequency $f_{max}$ of the driver IC 130 happens.

If the error signal $V_{ERROR}$ is too high, it will drive too much current through the second diode $D_2$. This will in turn saturate the emitter of the optocoupler 182 and will force the emitter resistance to be very close to zero. As a result, there will be a large voltage across the second maximum frequency resistor $R_{MAX2}$. If the voltage across the second maximum frequency resistor $R_{MAX2}$ is greater than the reference voltage $V_{REF}$, for example $V_{REF}$ may equal 3.5 volts, then the first diode $D_1$ will stop conducting current. This is when the minimum frequency $f_{min}$ of the driver IC 130 happens.

The minimum operating frequency $f_{min}$ when the reference voltage $V_{REF}$ is equal to 3.5 volts can be defined based on the discussion above as follows:

$$f_{min} = \frac{3.5}{R_{min}} \cdot 250 \text{ (KHz/mA)} \quad (2)$$

The maximum operating frequency $f_{max}$ when the reference voltage $V_{REF}$ is equal to 3.5 volts can be defined based on the discussion above as follows:

$$f_{max} = \frac{3.5}{\frac{R_{min} \cdot (R_1 + R_2)}{R_{min} + (R_1 + R_2)}} \cdot 250 \text{ (KHz/mA)} \quad (3)$$

Figure 2:
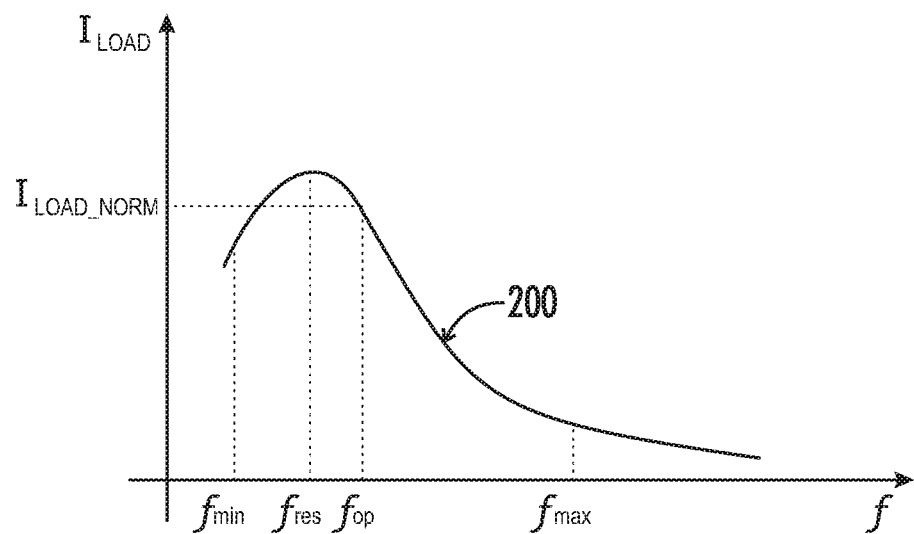
FIG. 2 is a graphical diagram representing the current gain curve of the output current versus frequency of the half-bridge resonant type DC-DC converter of FIG. 1.

Referring to FIG. 2, a current gain curve graph 200 of the output current $I_{LOAD}$ through the load $R_{LOAD}$ versus frequency f is provided for the converter 100. As mentioned above, the resonant circuit 140 will function at an operating frequency for on both sides of the resonant frequency $f_{res}$ (i.e., between the minimum frequency $f_{min}$ and the maximum frequency $f_{max}$). When the operating frequency $f_{op}$ is between the resonant frequency $f_{res}$ and the maximum operating frequency $f_{max}$, the output current $I_{LOAD}$ increases when the operating frequency $f_{op}$ decreases. This is associated with a closed-loop operating mode or normal operation of the converter 100 wherein closed-loop negative feedback control through the feedback circuit 170 functions properly. The closed-loop operating mode may also be referred to herein as a closed loop mode, a normal mode, or a normal operating mode. A normal load current $I_{LOAD}$_NORM corresponds to the operating frequency being between the minimum frequency $f_{min}$ and the maximum frequency $f_{max}$.

When the operating frequency $f_{op}$ is between the resonant frequency $f_{res}$ and the minimum operating frequency $f_{min}$, the output current $I_{LOAD}$ decreases when the operating frequency $f_{op}$ decreases. This is associated with an open loop operating mode. The open loop operating mode may also be referred to herein as an open loop mode, a frequency-clamp operating mode, or a frequency-clamp mode. In this mode, closed-loop negative feedback control through the feedback circuit 170 is lost.

When operating the converter 100 in the closed loop mode (i.e., associated with normal conditions), the operating frequency $f_{op}$ is greater than the resonant frequency $f_{res}$ in order to maintain closed-loop negative feedback control through the feedback circuit 170. The following control sequence relationships of the converter 100 are true only in the closed loop mode.

When the output current $I_{LOAD}$ is less than the reference current $I_{REF}$, the error signal $V_{ERROR}$ increases and thus supplies more current to the input stage of the optocoupler 182, the impedance of the output stage of the optocoupler 182 decreases, the voltage across the second maximum frequency resistor $R_{MAX2}$ increases, the current at the timing terminal $R_T$ increases, the operating frequency $f_{op}$ decreases, and finally the load current $I_{LOAD}$ increases.

When the output current $I_{LOAD}$ is greater than the reference current $I_{REF}$, the error signal $V_{ERROR}$ decreases and thus supplies less current to the input stage of the optocoupler 182, the impedance of the output stage of the optocoupler 182 increases, the voltage across the second maximum frequency resistor $R_{MAX2}$ decreases, the current at the timing terminal $R_T$ decreases, the operating frequency $f_{op}$ increases, and finally the load current $I_{LOAD}$ decreases.

As shown in FIG. 2, when in the closed loop operating mode, a decrease in the operating frequency $f_{op}$ will cause the load current $I_{LOAD}$ to increase. Negative feedback control works properly in the closed loop operating mode. As further shown in FIG. 2, when in the open loop operating mode, a decrease in the operating frequency $f_{op}$ will cause the load current $I_{LOAD}$ to decrease. Accordingly, negative feedback control will not work properly when the operating frequency $f_{op}$ is less than the resonant frequency $f_{res}$.

If by chance the operating frequency $f_{op}$ is pushed below the resonant frequency $f_{res}$ (i.e., open loop operating mode) and the output current $I_{LOAD}$ is less than the reference current $I_{REF}$, the control loop will continue to push the operating frequency down to the minimum frequency $f_{min}$ in an attempt to increase the load current $I_{LOAD}$. However, because the operating frequency is less than the resonant frequency $f_{res}$, a decrease to the operating frequency $f_{op}$ will cause the load current $I_{LOAD}$ to also decrease. Accordingly, the operating frequency $f_{op}$ will get stuck at the minimum frequency $f_{min}$ forever, unless the reference current $I_{REF}$ is changed, for example, by a dimming controller. This situation is associated with a loss of closed-loop negative feedback control.

Figure 3A:
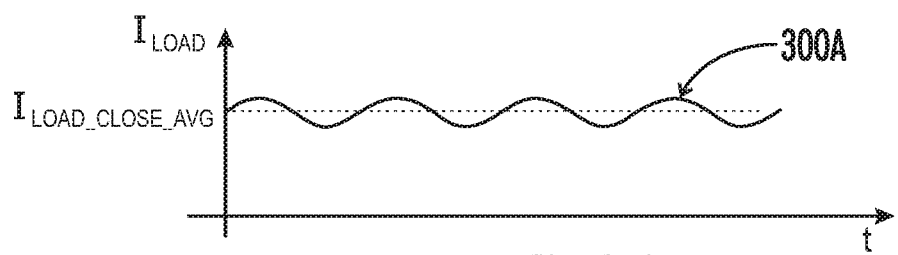
FIG. 3A is a graphical diagram representing a waveform of the average output current versus time when the half-bridge resonant type DC-DC converter of FIG. 1 operates in a closed loop mode.
Figure 3B:
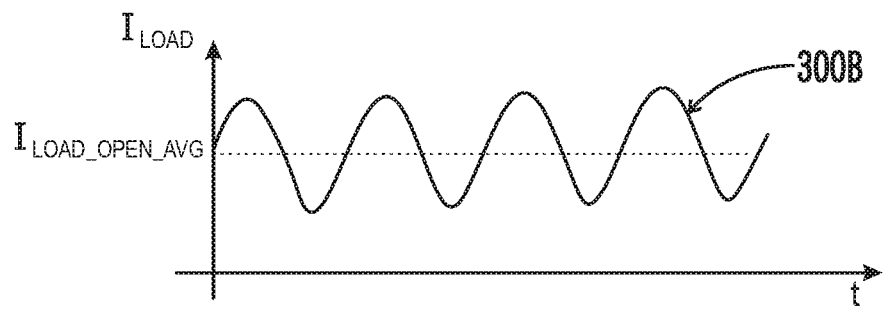
FIG. 3B is a graphical diagram representing a waveform of the average output current versus time when the half-bridge resonant type DC-DC converter of FIG. 1 operates in an open loop mode.

Referring to FIGS. 3A and 3B, close mode and open mode waveform graphs 300A, 300B associated with the output current $I_{LOAD}$ through the load $R_{LOAD}$ in the closed loop operating mode and the open loop operating mode are provided, respectively. The waveform graph 300A is associated with the close mode average output current $I_{LOAD\_CLOSE\_AVG}$ for the converter 100. The waveform graph 300B is associated with the open mode average output current $I_{LOAD\_OPEN\_AVG}$ for the converter 100. The converter 100 will continue to operate safely when the operating frequency $f_{op}$ is equal to the minimum frequency $f_{min}$ without closed-loop negative feedback control. In this situation, the ripple of the open mode average output current $I_{LOAD\_OPEN\_AVG}$, as shown in FIG. 3B, will be very large as compared to the ripple of the close mode average output current $I_{LOAD\_CLOSE\_AVG}$ associated with working closed-loop negative feedback control, as shown in FIG. 3A. The large ripple may cause the load current $I_{LOAD}$ to be greater than the rated current associated with the load $R_{LOAD}$, thus potentially and likely damaging the load $R_{LOAD}$.

Figure 4:
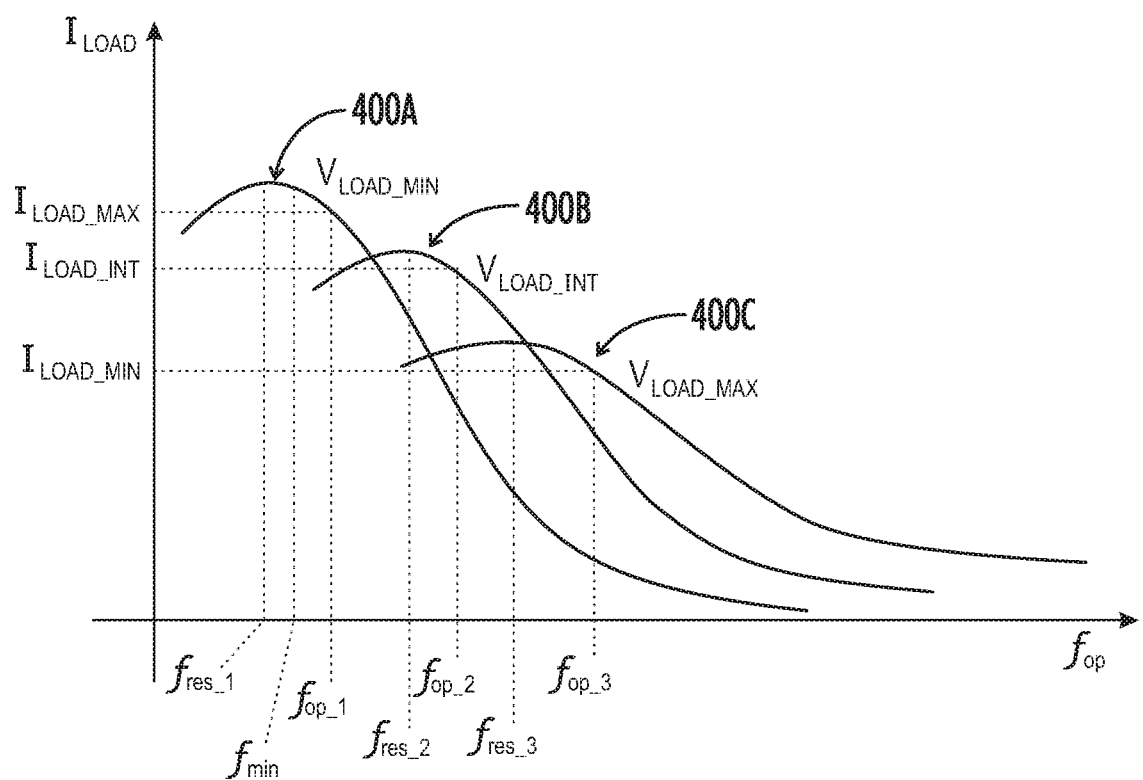
FIG. 4 is a graphical diagram representing the current gain curves of the output current versus frequency of the half-bridge resonant type DC-DC converter of FIG. 1 when the load operates under three different load conditions (e.g., a minimum load condition, an intermediate load condition, and a maximum load condition).

The converter 100 is a constant power driver. This means that the output current $I_{LOAD}$ can be programmed for different loads. For different loads, the current gain curve is different, as shown in FIG. 4. In other words, when a voltage $V_{LOAD}$ of the load $R_{LOAD}$ changes, the associated current gain curve changes.

As can best be seen in FIG. 4, current gain curve graphs 400A, 400B, 400C of the output current $I_{LOAD}$ versus frequency f are shown for three different loads including a minimum load, an intermedia load, and a maximum load, respectively, of the converter 100. The current gain curve graph 400A is associated with the load $R_{LOAD}$ operating at a minimum output voltage $V_{LOAD\_MIN}$. The current gain curve graph 400C is associated with the load $R_{LOAD}$ operating at a maximum output voltage $V_{LOAD\_MAX}$. And the current gain curve graph 400B is associated with the load $R_{LOAD}$ operating at an intermediate output voltage $V_{LOAD\_INT}$ between the minimum output voltage $V_{LOAD\_MIN}$ and the maximum output voltage $V_{LOAD\_MAX}$.

The maximum gain of each curve is different. When the load is at a minimum associated with the minimum output voltage $V_{LOAD\_MIN}$, the current has the highest current gain as shown by the current gain curve graph 400A. When the load is at a maximum associated with the maximum output voltage $V_{LOAD\_MAX}$, the current has the lowest current gain as shown by the current gain curve graph 400C. When the load is at an intermediate associated with the intermediate output voltage $V_{LOAD\_INT}$, the current has an intermediate current gain as show by the current gain curve graph 400B.

The current gain curve graph 400A includes a resonant frequency $f_{res\_1}$ and a first operating frequency $f_{op\_1}$ corresponding to a maximum load current $I_{LOAD\_MAX}$. The current gain graph 400B includes a resonant frequency $f_{res\_2}$ and a second operating frequency $f_{op\_2}$ corresponding to an intermediate load current $I_{LOAD}$_INT. The current gain curve graph 400C includes a resonant frequency $f_{res\_3}$ and a third operating frequency $f_{op\_3}$ corresponding to a minimum load current $I_{LOAD\_MAX}$. As illustrated, the self-resonant frequency decreases when the load voltage $V_{LOAD}$ decreases.

In the closed loop mode, or the normal operating mode, the resonant circuit 140 operates at a frequency above its self-resonant frequency. The minimum operating frequency $f_{op\_min}$ of the driver IC 130 is typically set to be slighter greater than resonant frequency $f_{res\_1}$ when the load $R_{LOAD}$ is at a minimum output voltage $V_{LOAD\_MIN}$, which is associated with the maximum output current $I_{LOAD\_MAX}$, as shown by current gain curve graph 400A. Accordingly, the maximum output current $I_{LOAD\_MAX}$ can be clamped by the minimum operating frequency $f_{op\_min}$. With regard to the current gain curve graphs 400B, 400C, however, the respective output currents $I_{LOAD}$ at the minimum operating frequency $f_{op\_min}$ are less than a target current associated with the maximum output current $I_{LOAD\_MAX}$. As a result, if the operating frequency $f_{op}$ of the converter 100 has been pushed to the minimum operating frequency $f_{op\_min}$ by the control loop, then the converter 100 will be stuck there (e.g., in the open loop mode) until or unless the reference current $I_{REF}$ is adjusted to be lower than the output current $I_{LOAD}$ at the minimum operating frequency $f_{op\_min}$ in order to reset the control loop (e.g., to transition it back into the closed loop mode).

The open loop mode, associated with the operating frequency $f_{op}$ being less than the resonant frequency $f_{res}$ and getting stuck at the minimum operating frequency $f_{op\_min}$, can happen during a sudden input AC voltage drop. If nothing is done to reset the feedback circuit 170, the driver IC 130 will remain operating at the minimum operating frequency $f_{op\_min}$ even after the input AC voltage returns back to normal after the sudden drop.

Figure 5:
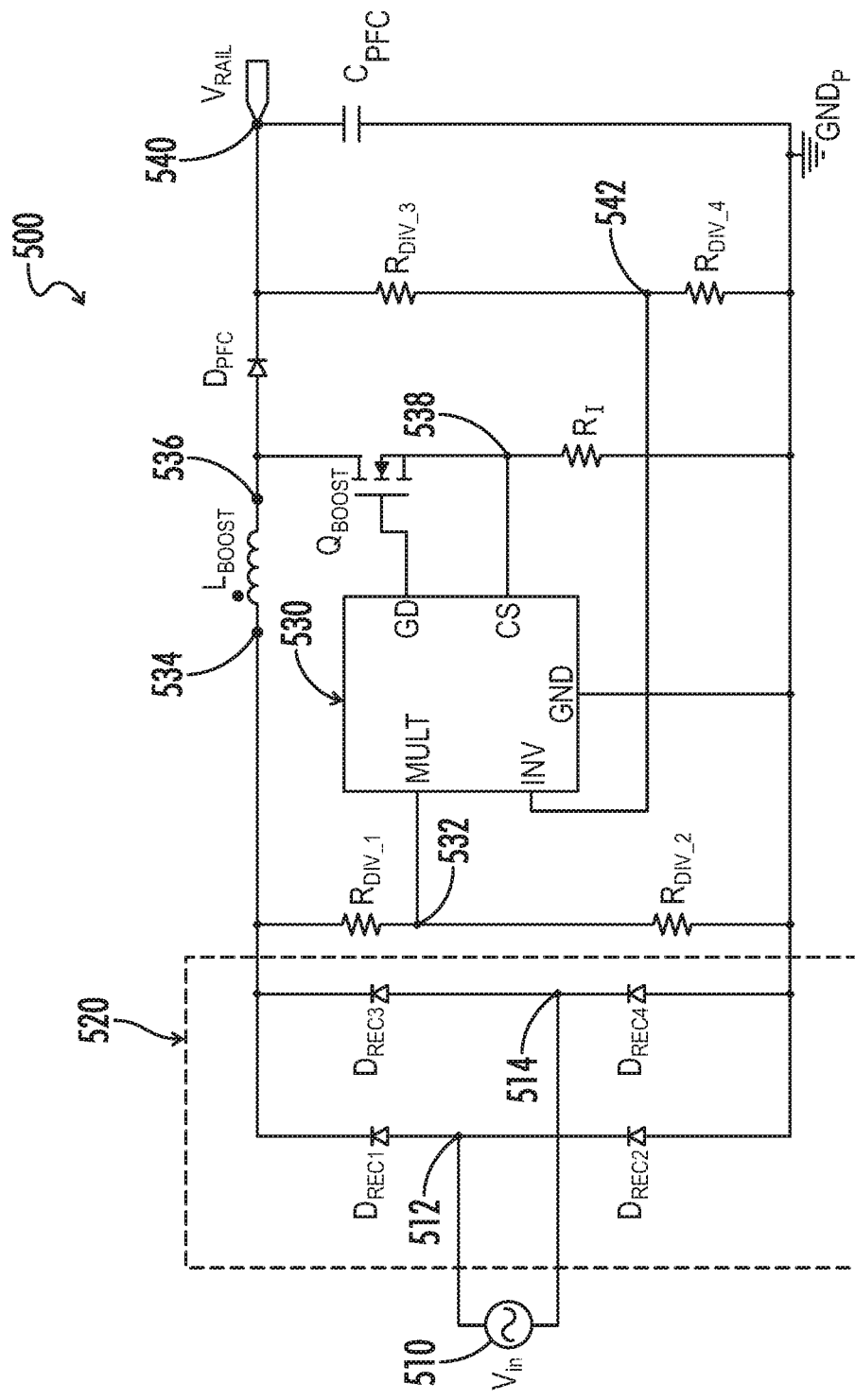
FIG. 5 is a circuit diagram representing a power factor correction (PFC) circuit configured to supply a rail voltage to the DC-DC converter of FIG. 1.

Referring to FIG. 5, a power factor correction (PFC) circuit 500 is provided. PFC circuitry is typical for high power LED drivers. The first DC voltage source 120 of the converter 100 is provided by an output of the PFC circuit 500. The PFC circuit 500 may also be referred to as a boost PFC circuit 500. The PFC circuit 500 is configured to force input AC current waveform to follow the input AC voltage waveform in order to achieve high power factor (PF) and low total harmonic distortion (THD). At the same time, the PFC circuit 500 provides a constant DC voltage to the first DC voltage source 120.

An AC source 510 provides an AC voltage (i.e., 120 VAC-277 VAC) across a first (line) input 512 and a second (neutral) input 514 of a rectifier circuit 520. The rectifier circuit 520 is configured as a full-wave bridge rectifier circuit that comprises a first rectifier diode $D_{REC\_1}$, a second rectifier diode $D_{REC\_2}$, a third rectifier diode $D_{REC\_3}$, and a fourth rectifier diode $D_{REC\_4}$, which are connected as shown.

The first input 512 of the AC source 510 is connected to the anode of the first rectifier diode $D_{REC\_1}$ and to the cathode of the third rectifier diode $D_{REC\_3}$. The second input 514 of the AC source 510 is connected to the anode of the second rectifier diode $D_{REC\_2}$ and to the cathode of the fourth rectifier diode $D_{REC\_4}$.

The cathodes of the first rectifier diode $D_{REC\_1}$ and the second rectifier diode $D_{REC\_2}$ are commonly connected to a positive voltage (V+) output terminal 522 of the rectifier circuit 112. The anodes of the third rectifier diode $D_{REC\_3}$ and the fourth rectifier diode $D_{REC\_4}$ are commonly connected to the primary circuit ground reference $GND_P$. The rectifier circuit 520 generates a full-wave rectified output voltage across the rectifier output filter capacitor in a conventional manner.

The PFC circuit 500 further includes a power factor corrector integrated circuit (PFGIC) 530. In the illustrated embodiment, the PFC IC 530 comprises an L6562 PFC IC, which is commercially available from STMicroelectronics of Geneva, Switzerland. Other power factor corrector integrated circuits from the same manufacturer or from other manufacturers may also be incorporated into the PFC circuit.

The PFC IC 530 includes an inverting input INV connected to an internal error amplifier of the PFC IC 530. A multiplier input MULT is connected to an internal multiplier stage of the PFC IC 530. A current sensing input CS is connected to an internal comparator of an internal control loop of the PFC IC 530. A gate driver output GD is connected to an internal push-pull output stage of the PFC IC 530. A ground return output GND completes the power connection and provides a ground reference for signals received and generated by the PFC IC 530.

As further shown in FIG. 5, the PFC IC 530 includes a first input voltage divider resistor $R_{DIV\_1}$ and a second input voltage divider resistor $R_{DIV\_2}$ connected in series between the positive voltage output terminal 522 of the rectifier circuit 520 and the primary circuit ground reference $GND_P$. The two resistors are connected at a common node 532 to provide a voltage (or multiplier signal) proportional to the time-varying output voltage from the rectifier circuit 520. The common node 532 is connected to the multiplier input MULT of the PFC IC 530. The PFC IC 530 uses the input signal to control the timing of output signals to thereby control the power factor.

The PFC circuit 500 further includes a boost inductor $L_{BOOST}$ having a first terminal 534 and a second terminal 536. The first terminal 534 of the boost inductor $L_{BOOST}$ in connected to the positive voltage output terminal 522 of the rectifier circuit 520. The second terminal 536 of the boost inductor $L_{BOOST}$ is connected to a drain terminal of a boost switch $Q_{BOOST}$. The voltage (or multiplier signal) at the common node 532 is the reference signal for the boost current through the boost inductor $L_{BOOST}$ and the input current from the AC source 510. The PCF IC 530 controls the boost inductor current peak to follow the voltage (or multiplier signal) at the common node 532 so that the line current of the AC source 510 will be in phase with the input voltage of the AC source 510 for achieving a high power factor (PF).

In the illustrated circuit, the boost switch $Q_{BOOST}$ comprises an n-channel enhancement mode metal oxide semiconductor field effect transistor (MOSFET). A gate terminal of the boost switch $Q_{BOOST}$ is connected to the gate drive output GD of the PFC IC 530. The PFC IC 530 is used to drive the boost switch $Q_{BOOST}$ based on signals transmitted from the gate drive output GD to the gate terminal for achieving power factor correction functionality. And finally, a source terminal of the boost switch $Q_{BOOST}$ is connected to a first terminal of a current sensing resistor $R_1$ at a current sensing node 538. A second terminal of the current sensing resistor $R_1$ is connected to the primary circuit ground reference $GND_P$. The current sensing node 538 is connected to the current sensing input CS of the PFC IC 530. The PFC IC 530 senses the current going through the boost switch $Q_{BOOST}$ using the current sensing resistor, and uses this signal to limit the maximum current going through the boost inductor $L_{BOOST}$ and the boost switch $Q_{BOOST}$ to avoid boost inductor saturation and over current of the boost switch $Q_{BOOST}$.

The current sensing resistor $R_1$ has a low resistance of, for example, 0.1 ohm such that the current flowing through the current sensing resistor generates a voltage at the source terminal of the boost switch $Q_{BOOST}$ that is proportional to the magnitude of the current. The voltage generated at the source terminal of the boost switch $Q_{BOOST}$ is coupled to the current sensing input CS of the PFC IC 530.

The PFC circuit 500 includes a PFC output diode $D_{PFC}$ having an anode connected to the second terminal 536 of the boost inductor $L_{BOOST}$ and a cathode connected to an output terminal 540 of the PFC circuit 500.

The PFC circuit 500 further includes an output buffer capacitor $C_{PFC}$, a third voltage divider resistor $R_{DIV\_3}$, and a fourth voltage divider resistor $R_{DIV\_4}$. The output buffer capacitor is coupled between the output terminal 540 of the PFC circuit 500 and the primary circuit ground reference $GND_P$. The third and fourth voltage divider resistors $R_{DIV\_3}$, $R_{DIV\_4}$ are coupled in series between the output terminal 540 of the PFC circuit 500 and the primary circuit ground reference $GND_P$. The third voltage divider resistor $R_{DIV\_3}$ is connected to the fourth voltage divider resistor $R_{DIV\_4}$ at a common node 542. The common node 542 is connected to the inverting input INV of the PFC IC 530. The PFC IC 530 regulates the output voltage at the output terminal 540 pf the PFC circuit 500 by sensing the output voltage through the third and fourth voltage divider resistors $R_{DIV\_3}$, $R_{DIV\_4}$ at the common node 542. The output voltage of the PFC circuit 500 is the first DC voltage source 120 as described above with respect to the half-bridge resonant type DC-DC converter 100.

When current is limited by the PFC IC 530, the maximum output power will be limited. The current sensed by the current sensing input CS of the PFC IC 530 follows:

$$I_{in\_peak\_max} = \frac{P_{in}}{V_{in\_min}} \cdot 2 \cdot \sqrt{2} = C_{sig} = 1.7 \text{ volts} \quad (4)$$

where $C_{sig}$ is the current sensing signal at the current sensing node 538.

From equation (4), we can see that when the input voltage reaches a minimum designated value $V_{in\_min}$, the PFC IC 530 will clamp the current sensing signal $C_{sig}$ at 1.7 volts, as well as the current going through the boost switch $Q_{BOOST}$ and the boost inductor $L_{BOOST}$. When the input voltage drops below $V_{in\_min}$, the input power $P_{in}$ will be clamped.

The input/output power relationship or balance can be defined as:

$$P_{in} = V_{in} \cdot I_{in} \cdot \cos\theta = P_{out} = V_{RAIL} \cdot I_{RAIL} \quad (5)$$

Since the associated circuit is a PFC circuit 500, the power factor (PF) will always be close to unit 1, so that the equation (5) can be rewritten as:

$$P_{in} = V_{in} \cdot I_{in} \cdot 1 = P_{out} = V_{RAIL} \cdot I_{RAIL} \quad (6)$$

From equation (6) we can see that if the input power $P_{in}$ received by the PFC circuit 500 from the AC source 510 is clamped, then the output power $P_{out}$ of the PFC circuit 500 will also be clamped. If the downstream stage converter is a constant power converter, such as for example the converter 100 of FIG. 1, then the PFC circuit 500 will not be able to maintain a constant rail voltage $V_{RAIL}$ when the input voltage $V_{in}$ drops below the minimum designated value $V_{in\_min}$.

Figure 6A:
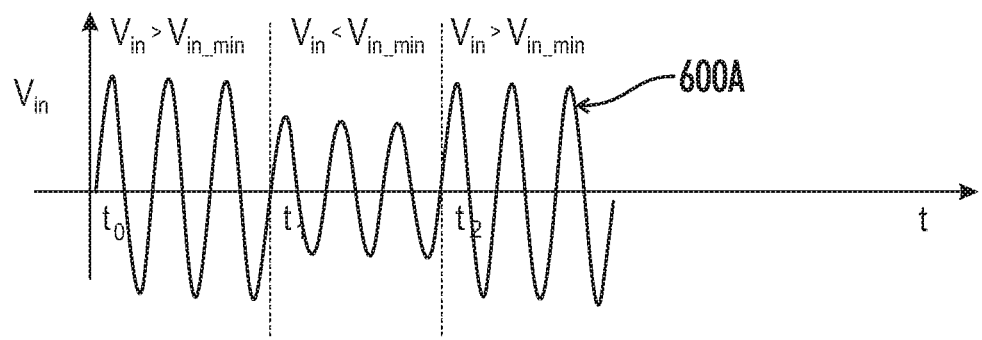
FIG. 6A is a graphical diagram representing an input voltage waveform of the PFC circuit of FIG. 5.
Figure 6B:
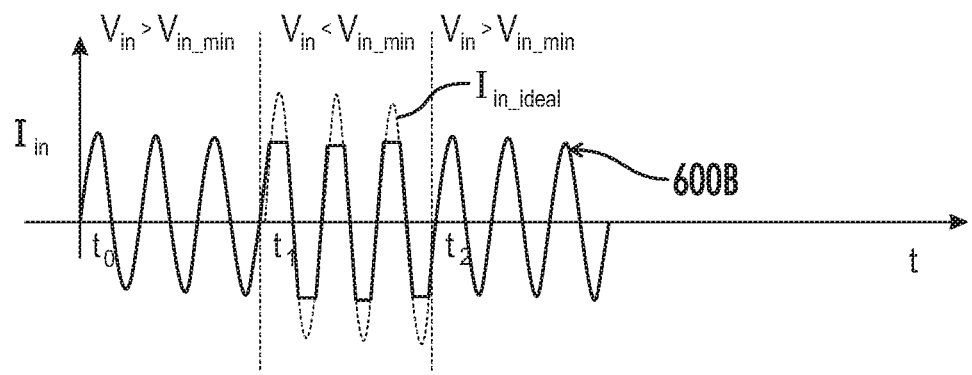
FIG. 6B is a graphical diagram representing an input current waveform of the PFC circuit of FIG. 5.
Figure 6C:
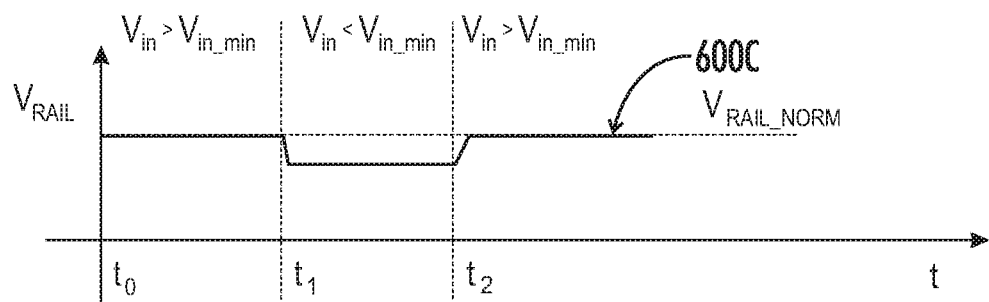
FIG. 6C is a graphical diagram representing an output rail voltage waveform of the PFC circuit of FIG. 5.

Referring to FIGS. 6A-6C illustrate the relationship between the input voltage $V_{in}$ of the AC source 510, the input current $I_{in}$ of the AC source 510, and the output rail voltage $V_{RAIL}$ of the PFC circuit 500. FIG. 6A illustrates an input voltage waveform 600A associated with the input voltage $V_{in}$ of the AC source 510 versus time. FIG. 6B illustrates an input current waveform 600B associated with the input current $I_{in}$ of the AC source 510 versus time. FIG. 6C illustrates an output rail voltage waveform 600C associated with the output rail voltage $V_{RAIL}$ of the PFC circuit 500 versus time.

Between time $t_0$ and time $t_1$, the input voltage $V_{in}$ is greater than the minimum designated value $V_{in\_min}$, as shown in FIG. 6A. During this time interval, the input current $I_{in}$ is in phase with the input voltage $V_{in\_min}$ and is not clamped, as shown in FIG. 6B. Likewise, during this time interval, the output rail voltage $V_{RAIL}$ is constant at the normal rail voltage $V_{RAIL}$_NORM, as shown in FIG. 6C.

Between time $t_1$ and time $t_2$, the input voltage $V_{in}$ is less than the minimum designated value $V_{in\_min}$, as shown in FIG. 6A. During this time interval, the input current $I_{in}$, while in phase with the input voltage $V_{in\_min}$, is clamped below an ideal input current $I_{in}$_ideal (dashed), as shown in FIG. 6B. Likewise, during this time interval, the output rail voltage $V_{RAIL}$ operates below the normal rail voltage $V_{RAIL}$_NORM, as shown in FIG. 6C.

After time $t_2$, the input voltage $V_{in}$ begins to operate above than the minimum designated value $V_{in\_min}$, as shown in FIG. 6A. Similarly, after time $t_2$, the input current $I_{in}$ returns to not being clamped, as shown in FIG. 6B. Likewise, after time $t_2$, the output rail voltage $V_{RAIL}$ quickly ramps back up to operating at the normal rail voltage $V_{RAIL\_NORM}$, as shown in FIG. 6C.

Accordingly, as shown in FIGS. 6A-6C, when the input voltage $V_{in}$ is greater than the minimum designated value $V_{in\_min}$, the input current in follows the input voltage waveform 600A and the output rail voltage $V_{RAIL}$ is maintained at the designated normal rail voltage $V_{RAIL\_NORM}$. When the input voltage $V_{in}$ drops below the minimum designated value $V_{in\_min}$, the input current in is clamped (e.g., like a flattop sinusoidal waveform) and the output rail voltage $V_{RAIL}$ loses regulation and drops to a value lower than the normal rail voltage $V_{RAIL\_NORM}$.

Figure 7:
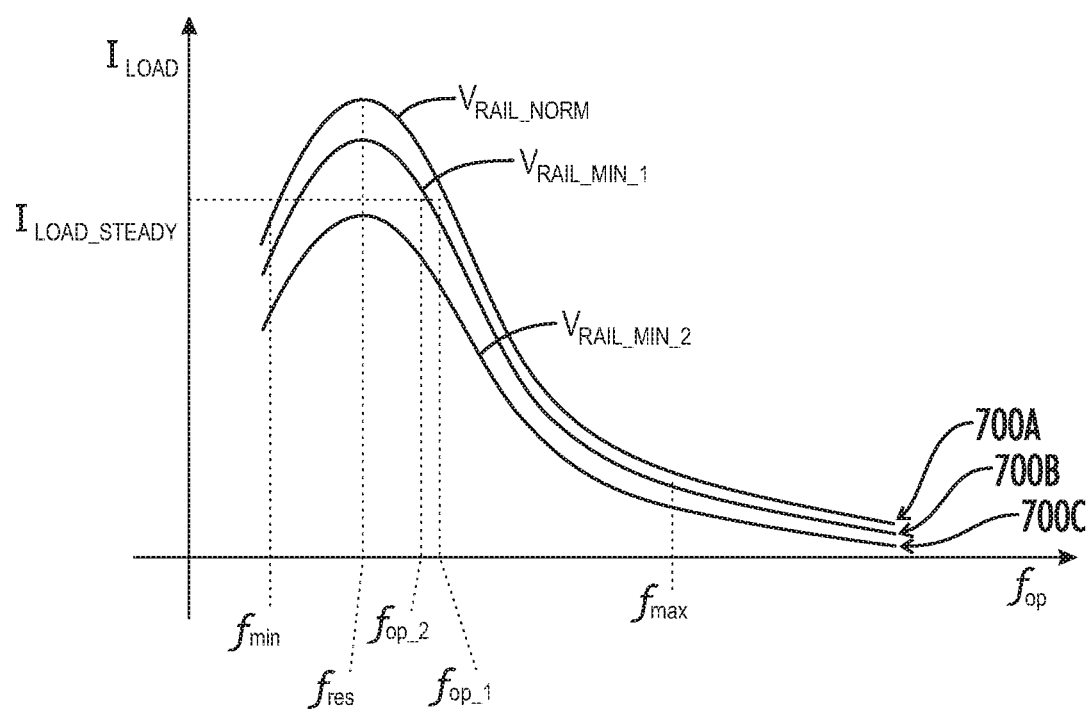
FIG. 7 is a graphical diagram representing multiple current gain curves of the output current versus frequency of the half-bridge resonant type DC-DC converter of FIG. 1 for three different rail voltages.

When the input voltage $V_{in}$ of the PFC circuit 500 drops, the current gain curve shape of the downstream stage DC-DC converter 100 will change, as shown in FIG. 7.

As can best be seen in FIG. 7, a first current gain curve 700A is associated with the normal rail voltage $V_{RAIL\_NORM}$, a second current gain curve 700B is associated with a first reduced rail voltage $V_{RAIL\_MIN\_1}$, and a third current gain curve 700C is associated with a second reduced rail voltage $V_{RAIL\_MIN\_2}$. The second reduced rail voltage $V_{RAIL\_MIN\_2}$ is lower than the first reduced rail voltage $V_{RAIL\_MIN\_1}$.

As shown in FIG. 7, we can see that when the rail voltage $V_{RAIL}$ is normal (i.e., equal to the normal rail voltage $V_{RAIL\_NORM}$) the operating frequency $f_{op}$ will be greater than the resonant frequency by design. A steady output current $I_{LOAD}$_STEADY of the converter 100 can be maintained by the first current gain curve 700A at a first operating frequency $f_{op\_1}$. When the rail voltage $V_{RAIL}$ drops (e.g., to the first reduced rail voltage $V_{RAIL\_MIN\_1}$), the current gain will reduce as represented by the second current gain curve 700B. In order to maintain the same steady output current $I_{LOAD\_STEADY}$ of the converter 100, the control loop will reduce the operating frequency for to a second operating frequency $f_{op\_2}$ in order to increase the output current $I_{LOAD}$.

When the input voltage $V_{in}$ of the AC source 510 drops low enough, the rail voltage $V_{RAIL}$ will similarly have a big reduction and the current gain will reduce as represented by the third current gain curve 700C. For the second reduced rail voltage $V_{RAIL\_MIN\_2}$, the current gain will never be enough for the converter 100 to maintain the steady output current $I_{LOAD\_STEADY}$ through the load $R_{LOAD}$. As a result, the control loop (i.e., the combination of the feedback circuit 170 and the current control circuit 180) will continue to reduce the operating frequency for in an attempt to increase the output current $I_{LOAD}$ (based on negative feedback loop design principals) until the operating frequency $f_{op}$ of the driver IC 130 reaches the minimum operating frequency $f_{min}$. Because the minimum operating frequency $f_{min}$ is less than the resonant frequency $f_{res}$, the converter 100 will operate the in open loop mode and the feedback circuit 170 will lose negative feedback control.

In the case of the rail voltage $V_{RAIL}$ being equal to the second reduced rail voltage $V_{RAIL\_MIN\_2}$, even after the rail voltage $V_{RAIL}$ increases back to $V_{RAIL\_NORM}$ after a temporary drop, the output current $I_{LOAD}$ will be less than the steady output current $I_{LOAD\_STEADY}$ (also known as the current control target) through the load $R_{LOAD}$. As a result, the control loop will never be able to recover from this open loop mode (also known as a clamped-frequency situation). The converter 100 will operate safely in this open loop mode at the minimum operating frequency $f_{min}$, however, the output power will be smaller, and the high output current ripple may be harmful to the LEDs of the load $R_{LOAD}$, as discussed above. Accordingly, it is very desirable to have a control method to recover the negative feedback control of the feedback circuit 170 after a temporary voltage drop.

When the load $R_{LOAD}$, comprising one or more high voltage LEDs, works in the normal rail voltage $V_{RAIL\_NORM}$ situation, the waveforms of the current control voltage $V_{C\_BUFF}$ across the buffer capacitor $C_{BUFF}$, the output current $I_{LOAD}$, the error signal $V_{ERROR}$, and the operating frequency fop versus time are shown FIGS. 8A-8D, respectively.

Figure 8A:
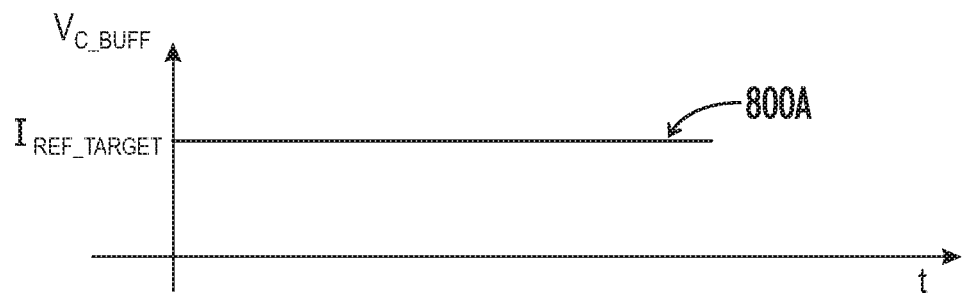
FIG. 8A is a graphical diagram representing a current control voltage waveform of the voltage across a buffer capacitor versus time associated with the rail voltage of the half-bridge resonant type DC-DC converter of FIG. 1 being equal to a normal rail voltage.
Figure 8B:
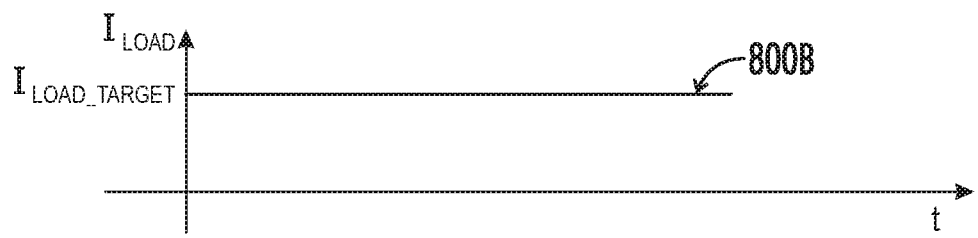
FIG. 8B is a graphical diagram representing an output current waveform of the output current versus time associated with the rail voltage of the half-bridge resonant type DC-DC converter of FIG. 1 being equal to a normal rail voltage.
Figure 8C:
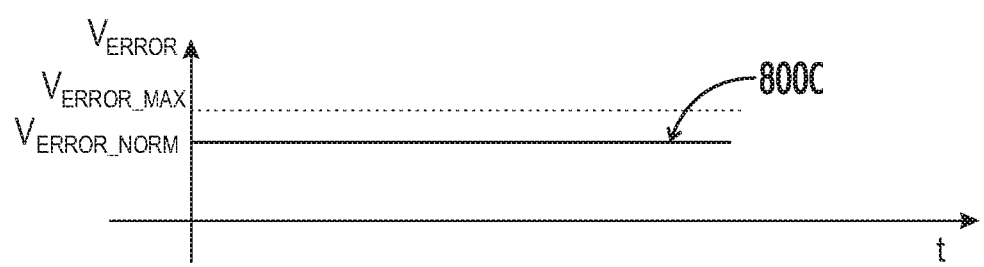
FIG. 8C is a graphical diagram representing an error signal waveform of the error signal versus time associated with the rail voltage of the half-bridge resonant type DC-DC converter of FIG. 1 being equal to a normal rail voltage.
Figure 8D:
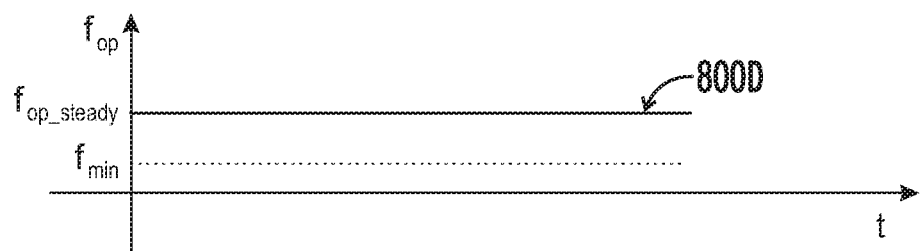
FIG. 8D is a graphical diagram representing an operating frequency waveform of the of the operating frequency versus time associated with the rail voltage of the half-bridge resonant type DC-DC converter of FIG. 1 being equal to a normal rail voltage.

A current control voltage waveform 800A corresponding to the current control voltage $V_{C\_BUFF}$ across the buffer capacitor $C_{BUFF}$ versus time is substantially stable at a target reference current $I_{REF}$_TARGET (i.e., a set value of the reference current $I_{REF}$), as shown in FIG. 8A. An output current waveform 800B corresponding to the output current $I_{LOAD}$ of the converter 100 versus time is substantially stable at a target output current $I_{LOAD}$_TARGET (i.e., a set value of the output current $I_{LOAD}$), as shown in FIG. 8B. The set value of the output current $I_{LOAD}$ may be equal to the set value of the reference current $I_{REF}$. An error signal waveform 800C corresponding to the error signal $V_{ERROR}$ of the feedback circuit 170 versus time is substantially stable at a value, namely a steady state error signal $V_{ERROR\_NORM}$, less than the maximum saturated OPAMP output $V_{ERROR\_MAX}$, as shown in FIG. 8C. An operating frequency waveform 800D corresponding to the operating frequency $f_{op}$ of the driver IC 130 versus time is substantially stable at a steady operating frequency $f_{op\_steady}$ greater than the minimum operating frequency $f_{min}$, as shown in FIG. 8D. The steady operating frequency $f_{op\_steady}$ may correspond to the first operating frequency $f_{op\_1}$, as shown in FIG. 7. In this normal rail voltage $V_{RAIL\_NORM}$ situation, the converter 100 is considered to be function in the closed loop mode with negative feedback control of the feedback circuit 170 functioning properly.

Whenever the AC source 510 experiences a temporary drop in the input voltage $V_{in}$ to a value below the minimum designated value $V_{in\_min}$, the output or rail voltage $V_{RAIL}$ of the PFC circuit 500 will drop as well as the current gain of the converter 100, as shown in FIG. 7. If the rail voltage $V_{RAIL}$ drops too much, then the current gain will not be enough to maintain the target output current $I_{LOAD\_TARGET}$ at any operating frequency $f_{op}$, as shown by the third current gain curve 700C in FIG. 7. The control loop will continued to increase the error signal $V_{ERROR}$ to reduce the operating frequency $f_{op}$ in order to try to increase the output current $I_{LOAD}$ in accordance with negative feedback logic, however, the real output current $I_{LOAD}$ achieved will always be lower than the target output current $I_{LOAD\_TARGET}$, also known as the current reference current $I_{REF}$, as shown in FIG. 7. As a result, the control loop will push down the operating frequency $f_{op}$ to the minimum operating frequency $f_{min}$ and get stuck there.

After the temporary voltage drop, the input voltage $V_{in}$ will increase back to normal (i.e., a value greater the minimum designated value $V_{in\_min}$, as represented by the first current gain curve 700A) and the rail voltage $V_{RAIL}$ will increase back to normal. However, according to the first current gain curve 700A of FIG. 7, the output current $I_{LOAD}$ at the minimum operating frequency $f_{min}$ will still be less than the target reference current $I_{REF\_TARGET}$. As a result, the error signal $V_{ERROR}$ will remain at the maximum saturated OPAMP output $V_{ERROR}$_MAX and the operating frequency $f_{op}$ will remain at the minimum operating frequency $f_{min}$.

Figure 9A:
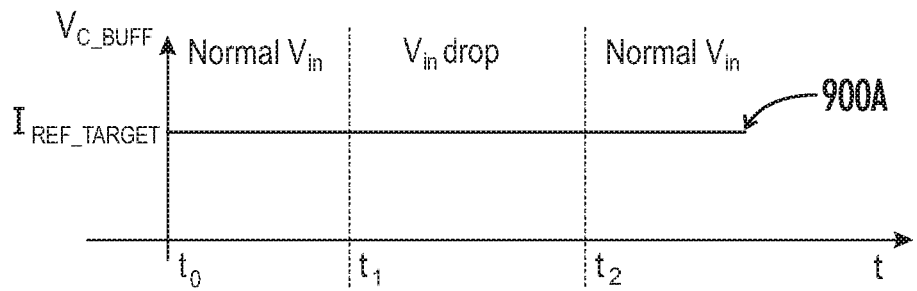
FIG. 9A is a graphical diagram representing a current control voltage waveform of the voltage across the buffer capacitor versus time in accordance with a control sequence of the half-bridge resonant type DC-DC converter of FIG. 1.
Figure 9B:
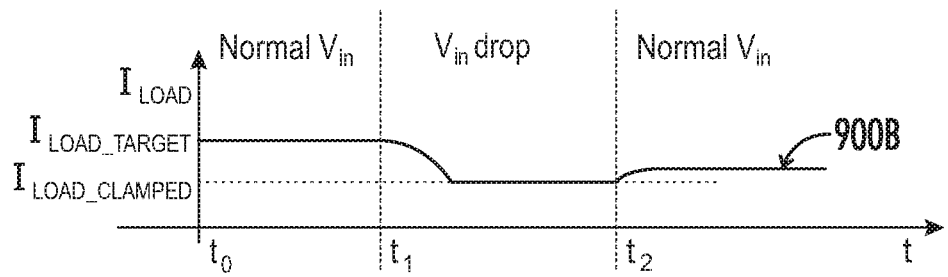
FIG. 9B is a graphical diagram representing an output current waveform of the output current versus time associated with the control sequence of the half-bridge resonant type DC-DC converter of FIG. 1.
Figure 9C:
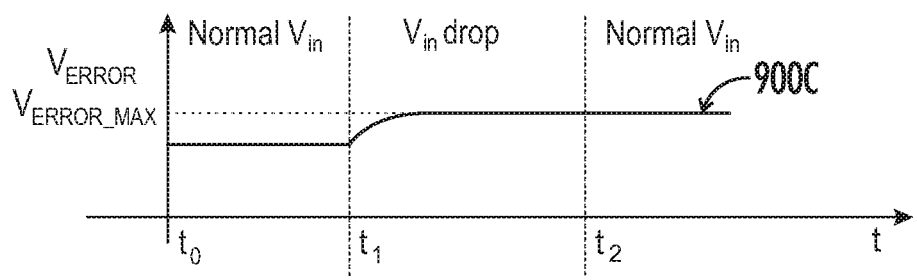
FIG. 9C is a graphical diagram representing an error signal waveform of the error signal versus time associated with the control sequence of the half-bridge resonant type DC-DC converter of FIG. 1.
Figure 9D:
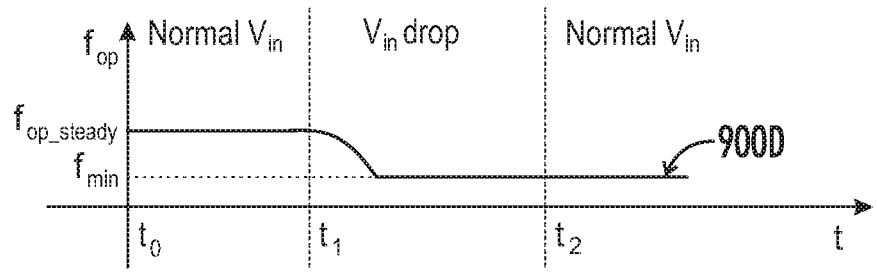
FIG. 9D is a graphical diagram representing an operating frequency waveform of the of the operating frequency versus time associated with the control sequence of the half-bridge resonant type DC-DC converter of FIG. 1.

Referring to FIGS. 9A-9D, a control sequence of the control loop of the converter 100 is provided, in accordance with the above discussion. A current control voltage waveform 900A corresponding to the current control voltage $V_{C\_BUFF}$ across the buffer capacitor $C_{BUFF}$ versus time based on the control sequence is shown in FIG. 9A. An output current waveform 900B corresponding to the output current $I_{LOAD}$ of the converter 100 versus time based on the control sequence is shown in FIG. 9B. An error signal waveform 900C corresponding to the error signal $V_{ERROR}$ of the feedback circuit 170 versus time based on the control sequence is shown in FIG. 9C. An operating frequency waveform 900D corresponding to the operating frequency $f_{op}$ of the driver IC 130 versus time based on the control sequence is shown in FIG. 9D.

Between time to and time $t_1$, the input voltage $V_{in}$ is normal or greater than the greater the minimum designated value $V_{in\_min}$. During this time interval, the current control voltage $V_{C\_BUFF}$ across the buffer capacitor $C_{BUFF}$ is substantially stable at the target reference current $I_{REF\_TARGET}$, as shown in FIG. 9A. The output current $I_{LOAD}$ is substantially stable at the target output current $I_{LOAD\_TARGET}$, as shown in FIG. 9B. The error signal $V_{ERROR}$ is substantially stable at a value less than the maximum saturated OPAMP output $V_{ERROR\_MAX}$, as shown in FIG. 9C. And finally, the operating frequency $f_{op}$ is substantially stable at the steady operating frequency $f_{op\_steady}$, as shown in FIG. 9D.

Between time $t_1$ and $t_2$, the input voltage $V_{in}$ drops to a valueless than the minimum designated value $V_{in\_min}$. During this time interval, the current control voltage $V_{C\_BUFF}$ across the buffer capacitor $C_{BUFF}$ remains unchanged and is substantially stable at the target reference current $I_{REF\_TARGET}$, as shown in FIG. 9A. The output current $I_{LOAD}$ drops to a clamped output current $I_{LOAD\_CLAMPED}$ that is less than the target output current $I_{LOAD\_TARGET}$, as shown in Fig. FIG. 9B. The error signal $V_{ERROR}$ increases to the maximum saturated OPAMP output $V_{ERROR\_MAX}$, as shown in FIG. 9C. And finally, the operating frequency $f_{op}$ decreases to the minimum operating frequency $f_{min}$, as shown in FIG. 9D.

After time $t_2$, the input voltage $V_{in}$ goes back to normal (i.e., is greater than the greater the minimum designated value $V_{in\_min}$). During this time interval, the current control voltage $V_{C\_BUFF}$ across the buffer capacitor $C_{BUFF}$ remains unchanged and is substantially stable at the target reference current $I_{REF\_TARGET}$, as shown in FIG. 9A. The output current $I_{LOAD}$ remains at the clamped output current $I_{LOAD\_CLAMPED}$, the error signal $V_{ERROR}$ remains at the maximum saturated OPAMP output $V_{ERROR\_MAX}$, and the operating frequency $f_{op}$ remains at the minimum operating frequency/mm, as shown in FIGS. 9B-9D, respectively, due to the fact that the circuit has no way to recover once the minimum frequency is reached. As discussed above, in order to bring back the negative feedback current control of the feedback circuit 170 and get out of the frequency-clamp mode, we have to reset the error signal to un-clamp the frequency.

In the normal mode, the error signal $V_{ERROR}$ is always less than the maximum saturated OPAMP output $V_{ERROR\_MAX}$. Accordingly, if the error signal $V_{ERROR}$ does reach the maximum saturated OPAMP output $V_{ERROR\_MAX}$, then this means that something went wrong and that there is a need to reset the control loop. As a result, the error signal $V_{ERROR}$ may serve as a good indication of whether the converter 100 is in the normal mode (or closed loop mode) or in the frequency-clamp mode (or open loop mode). It may be possible to sense the error signal $V_{ERROR}$ of the feedback circuit 170 and to dynamically adjust the current control voltage $V_{C\_BUFF}$ across the buffer capacitor $C_{BUFF}$ associated with the reference current $I_{REF}$ in order to bring back negative feedback control of the feedback circuit 170 and get the converter 100 out of the frequency clamping mode.

Figure 10:
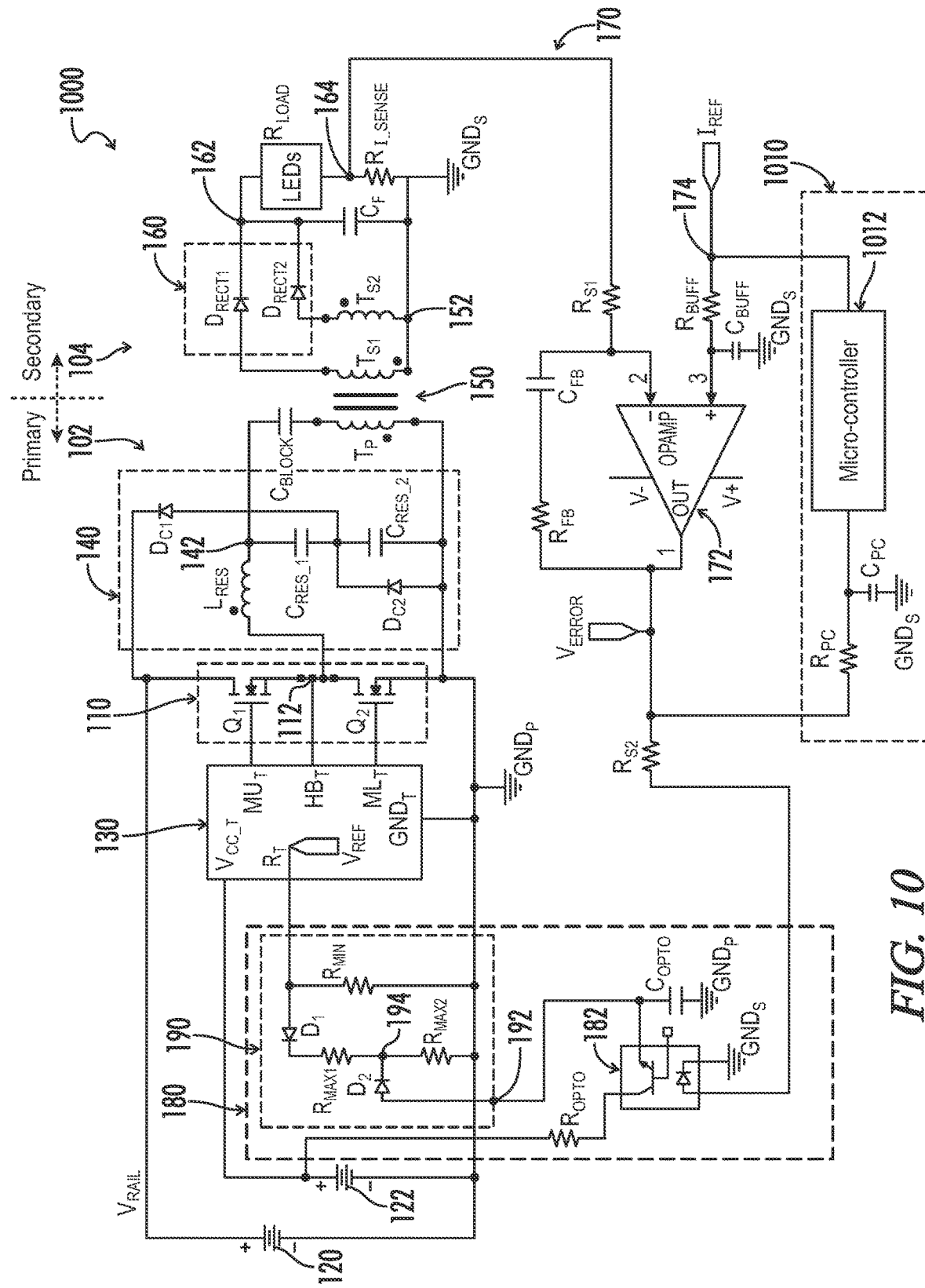
FIG. 10 is a circuit diagram representing another embodiment of a half-bridge resonant type DC-DC converter as disclosed herein, with a power control circuit configured to reestablish normal operation after sensing a frequency-clamp mode due to input voltage fluctuations.

Referring to FIG. 10, an improved half-bridge resonant type DC-DC converter 1000 is provided having a power control circuit 1010. In order to simplify the description of the improved converter 1000, similar elements are numbered or labeled similarly to those of the converter 100. The power control circuit 1010 implements a power control method that relies upon sensing the error signal $V_{ERROR}$ at the output of the feedback circuit 170.

The power control circuit 1010 is connected between the output terminal of the OPAMP 172 of the feedback circuit 170 and the reference current node 174 of the feedback circuit 170. The power control circuit 1010 includes at least a controller 1012, a power control resistor $R_{PC}$, and a power control capacitor $C_{PC}$. A first terminal of the power control resistor $R_{PC}$ is connected to the output terminal of the OPAMP 172. A second terminal of the power control resistor $R_{PC}$ is connected to an input of the controller 1012. An output of the controller 1012 is connected to the reference current node 174 of the feedback circuit 170. The power control capacitor $C_{PC}$ is connected between the input of the controller 1012 and the secondary circuit ground reference $GND_S$. The error signal $V_{ERROR}$ is fed into the controller 1012 through the power control resistor $R_{PC}$ and is filtered by the power control capacitor Cc.

Figure 11:
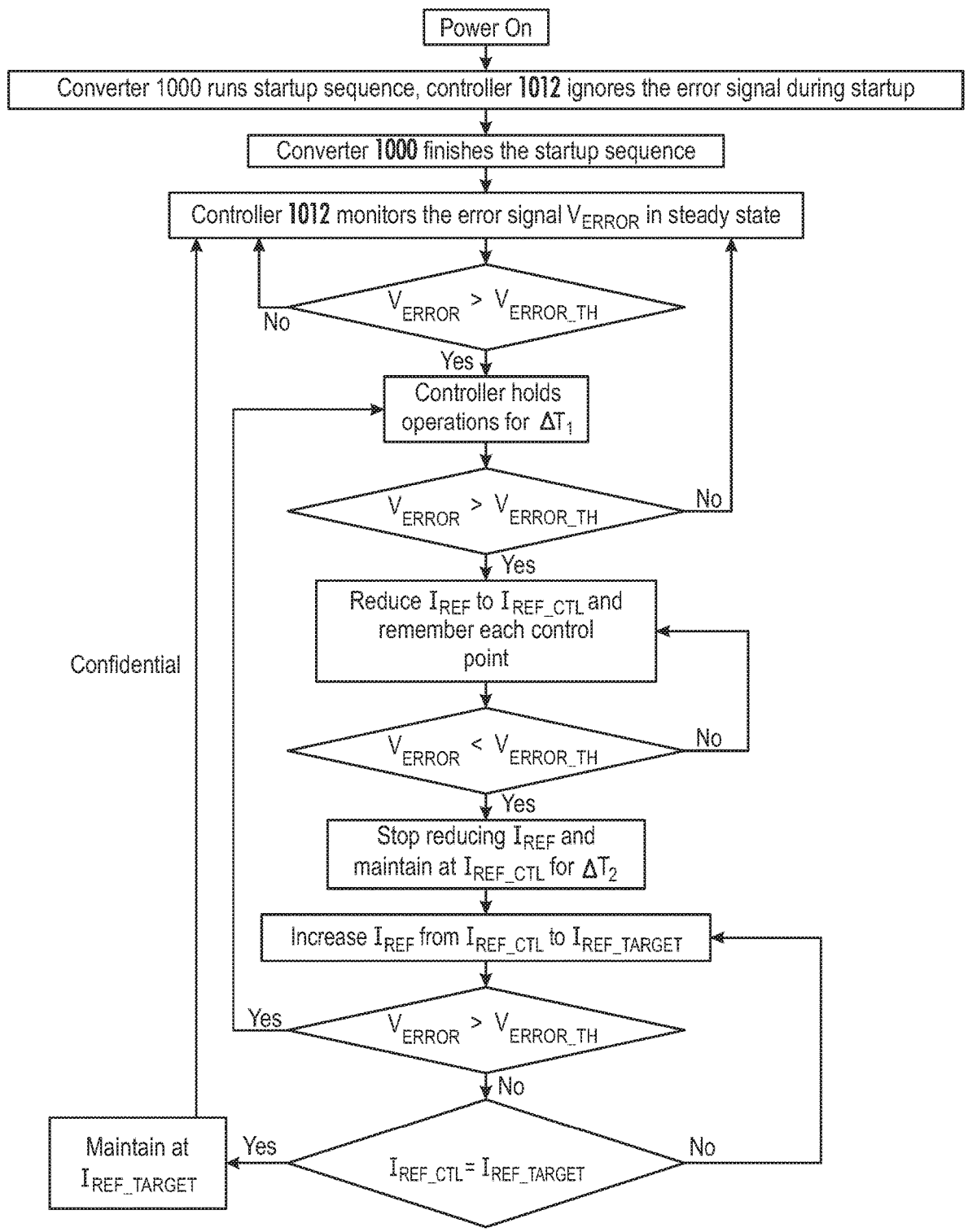
FIG. 11 is a flowchart representing a control method to be implemented by the power control circuit of FIG. 10.

The controller may be preprogrammed with software configured to enable the controller 1012 to execute the steps of the control flow chart shown in FIG. 11. The steps of the control flow chart may define at least a portion of a power control method to be implemented during input voltage fluctuations.

The converter 1000, upon being supplied with power, runs an initial startup sequence. During the startup sequence of the converter 1000, the controller 1012 is configured to ignore the error signal $V_{ERROR}$ because of a potential for voltage overshoot of the error signal $V_{ERROR}$ due to control delay of the driver IC 130. The controller 1012 may sense that the startup sequence of the converter 1000 is complete.

After the startup sequence is complete, the controller 1012 constantly monitors the error signal $V_{ERROR}$ in the steady state to make sure it is less than a present threshold voltage $V_{ERROR\_TH}$. When the error signal $V_{ERROR}$ reaches the threshold voltage $V_{ERROR\_TH}$, the operating frequency $f_{op}$ reaches the minimum operating frequency $f_{min}$. At this point, the error signal $V_{ERROR}$ may continue to increase to the maximum saturated OPAMP output $V_{ERROR\_MAX}$, however, the operating frequency $f_{op}$ of the driver IC 130 will not change because the minimum operating frequency $f_{min}$ is clamped by the minimum frequency resistor $R_{MIN}$. The threshold voltage $V_{ERROR\_TH}$ is selected, potentially during the initial programming or during implementation, to be greater than the steady state error signal $V_{ERROR\_NORM}$ and less than the maximum saturated OPAMP output $V_{ERROR\_MAX}$.

If at any time the error signal $V_{ERROR}$ reaches the threshold voltage $V_{ERROR\_TH}$, the controller 1012 will go through a power control sequence to reset the error signal $V_{ERROR}$ in order to get the error signal $V_{ERROR}$ back to the steady state error signal $V_{ERROR\_NORM}$. By getting the error signal $V_{ERROR}$ back to the steady state error signal $V_{ERROR\_NORM}$, the controller 1012 is able to reestablish negative feedback control of the feedback circuit 170 and cause the converter 1000 to resume operating in the normal mode at the target output current $I_{LOAD\_TARGET}$.

Figure 12A:
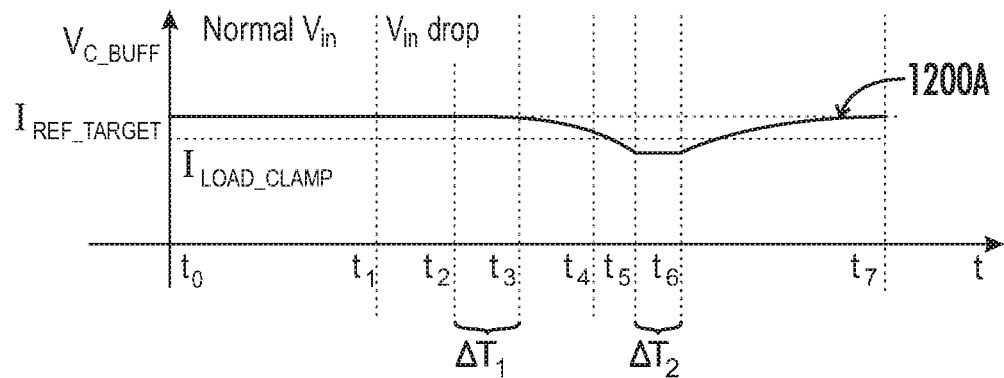
FIG. 12A is a graphical diagram representing a current control voltage waveform of the voltage across the buffer capacitor versus time in accordance with a control sequence of the improved half-bridge resonant type DC-DC converter of FIG. 10 when input voltage fluctuations are present.
Figure 12B:
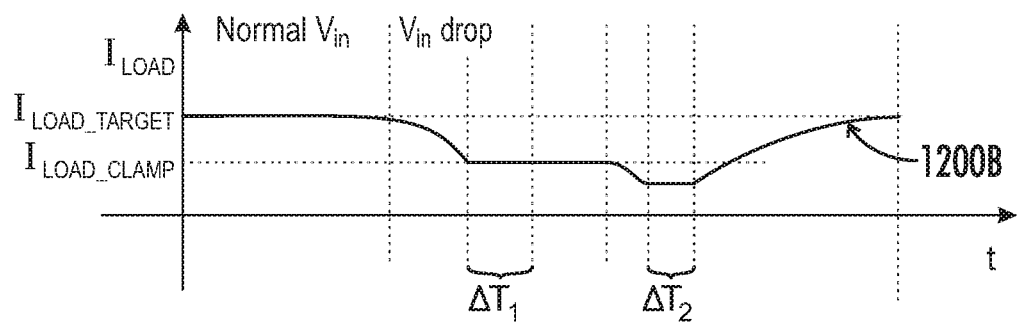
FIG. 12B is a graphical diagram representing an output current waveform of the output current versus time associated with the control sequence of the improved half-bridge resonant type DC-DC converter of FIG. 10 when input voltage fluctuations are present.
Figure 12C:
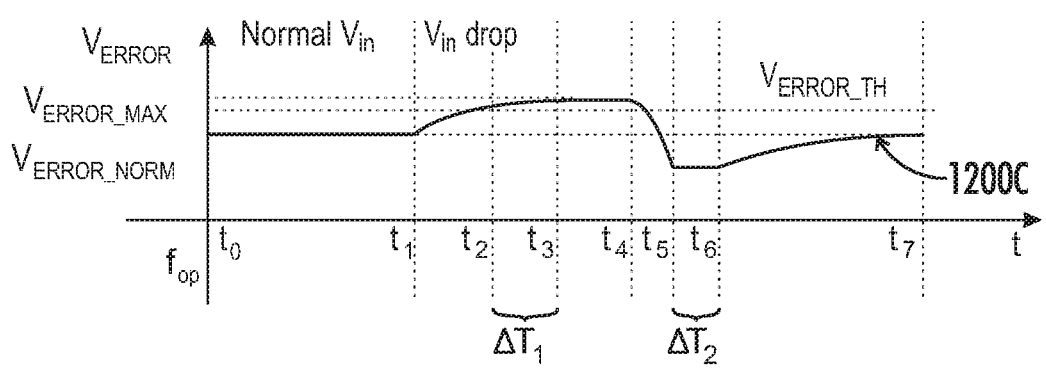
FIG. 12C is a graphical diagram representing an error signal waveform of the error signal versus time associated with the control sequence of the improved half-bridge resonant type DC-DC converter of FIG. 10 when input voltage fluctuations are present.
Figure 12D:
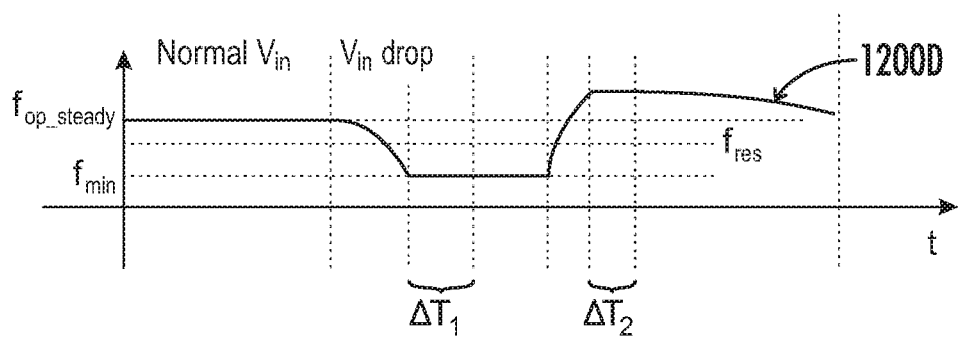
FIG. 12D is a graphical diagram representing an operating frequency waveform of the of the operating frequency versus time associated with the control sequence of the improved half-bridge resonant type DC-DC converter of FIG. 10 when input voltage fluctuations are present.

Referring to FIGS. 12A-12D, a control sequence of the control loop of the converter 1000 is provided, in accordance with the above discussion. A current control voltage waveform 1200A corresponding to the current control voltage $V_{C\_BUFF}$ across the buffer capacitor $C_{BUFF}$ versus time based on the control sequence is shown in FIG. 12A. An output current waveform 1200B corresponding to the output current $I_{LOAD}$ of the converter 1000 versus time based on the control sequence is shown in FIG. 12B. An error signal waveform 1200C corresponding to the error signal $V_{ERROR}$ of the feedback circuit 170 versus time based on the control sequence is shown in FIG. 12C. An operating frequency waveform 1200D corresponding to the operating frequency $f_{op}$ of the driver IC 130 versus time based on the control sequence is shown in FIG. 12D.

Between time to and time $t_1$, the input voltage $V_{in}$ is normal or greater than the greater the minimum designated value $V_{in\_min}$. During this time interval, the current control voltage $V_{C\_BUFF}$ across the buffer capacitor $C_{BUFF}$ is substantially stable at the target reference current $I_{REF\_TARGET}$, as shown in FIG. 12A. The output current $I_{LOAD}$ is substantially stable at the target output current $I_{LOAD\_TARGET}$ which is the same as the target reference current $I_{REF\_TARGET}$, as shown in FIG. 12B. The error signal $V_{ERROR}$ is substantially stable at a value less than the threshold voltage $V_{ERROR\_TH}$, as shown in FIG. 12C. And finally, the operating frequency $f_{op}$ is substantially stable at the steady operating frequency $f_{op\_steady}$ which is greater than the minimum operating frequency $f_{min}$, as shown in FIG. 12D. The steady operating frequency $f_{op\_steady}$ is also greater than the resonant frequency $f_{res}$.

At time $t_1$ the input voltage $V_{in}$ experiences a sudden voltage drop, which in turn causes a big rail voltage $V_{RAIL}$ drop and the output current $I_{LOAD}$ to drop. Since the reference current $I_{REF}$ is generally fixed, unless being acted on by the power control circuit 1010, the current control voltage $V_{C\_BUFF}$ across the buffer capacitor $C_{BUFF}$ remains substantially stable at the target reference current $I_{REF\_TARGET}$, as shown in FIG. 12A. The drop in the output current $I_{LOAD}$ causes the error signal $V_{ERROR}$ to increase rapidly in order to reduce the operating frequency for in order to increase the output current $I_{LOAD}$ due to negative feedback design, as shown in FIGS. 12B-12D. However, at a lower rail voltage, for example at the second reduced rail voltage $V_{RAIL\_MIN\_2}$, the current gain, represented by the third current gain curve 700C of FIG. 7, is not enough to maintain the output current $I_{LOAD}$ at the target output current $I_{LOAD\_TARGET}$. Accordingly, the error signal $V_{ERROR}$ continues to increase to at least the threshold voltage $V_{ERROR\_TH}$, as shown in FIG. 12C.

At time $t_2$, the error signal $V_{ERROR}$ reaches the threshold voltage $V_{ERROR\_TH}$ and causes the operating frequency $f_{op}$ at the minimum operating frequency $f_{min}$, as shown in FIGS. 12B and 12C. As a result, the output current $I_{LOAD}$ will drop to the clamped output current $I_{LOAD\_CLAMPED}$, as shown in FIG. 12B. Accordingly, at time $t_2$, the controller 2012 senses that the error signal $V_{ERROR}$ has reached the threshold voltage $V_{ERROR\_TH}$.

Between time $t_2$ and time $t_3$, as designed, the controller 1012 will hold, or wait for a first time period $\Delta T_1$, to let the converter 1000 to stabilize at the minimum operating frequency $f_{min}$. The first time period $\Delta T_1$ corresponds to the time period between time $t_2$ and time $t_3$. During this first time period $\Delta T_1$, the error signal $V_{ERROR}$ increase further to the maximum saturated OPAMP output $V_{ERROR\_MAX}$, as shown in FIG. 12C.

At time $t_3$, after the holding or waiting period (i.e., the first change in time $\Delta T_1$), the controller 1012 starts to reduce the current control voltage $V_{C\_BUFF}$ across the buffer capacitor $C_{BUFF}$ by controlling the reference current $I_{REF}$, as shown in FIG. 12A. The controller 1012 is configured to remember each reference current control point as it adjusts the reference current $I_{REF}$. Until the current control voltage $V_{C\_BUFF}$ across the buffer capacitor $C_{BUFF}$ has been reduced to that corresponding to the clamped output current $I_{LOAD\_CLAMPED}$, the error signal $V_{ERROR}$ will remain at the maximum saturated OPAMP output $V_{ERROR}$_MAX and the operating frequency for will remain at the minimum operating frequency $f_{min}$, as shown in FIGS. 12C and 12D.

At time $t_4$, the current control voltage $V_{C\_BUFF}$ across the buffer capacitor $C_{BUFF}$ has been reduced to that corresponding to the clamped output current $I_{LOAD\_CLAMPED}$. Accordingly, at time $t_4$, the error signal $V_{ERROR}$ will decrease since the output current $I_{LOAD}$ will be greater than the reference current $I_{REF}$, now set to a lower value, the clamped output current $I_{LOAD\_CLAMPED}$. Likewise, the operating frequency $f_{op}$ will increase as a result of the decrease in the error signal $V_{ERROR}$.

Between time $t_4$ and time $t_5$, the controller 1012, the controller 1012 continues reducing the reference current $I_{REF}$ to a control point $I_{REF\_CTL}$ associated with the controller 1012 sensing that the error signal $V_{ERROR}$ is less than the threshold voltage $V_{ERROR\_TH}$. Due to control delay, the error signal $V_{ERROR}$, the operating frequency $f_{op}$, and the output current $I_{LOAD}$ will be stabilized at a certain level. At this level, the output current $I_{LOAD}$ will be less than the clamped output current $I_{LOAD\_CLAMPED}$, as shown in FIG. 12B, and the operating frequency $f_{op}$ will be pushed to be greater than the resonant frequency $f_{res}$, as shown in FIG. 12D. As a result, negative current control of the feedback circuit 170 will be restored.

Between time $t_5$ and time $t_6$, the controller 1012 will maintain this new level of stable operating for a second time period $\Delta T_2$. The second time period $\Delta T_2$ corresponds to the time period between time $t_5$ and time $t_6$.

At time $t_6$, the controller 1012 starts to increase the current control voltage $V_{C\_BUFF}$ across the buffer capacitor $C_{BUFF}$ by controlling the reference current $I_{REF}$. The controller 1012 increases the reference current $I_{REF}$ back to the target reference current $I_{REF\_TARGET}$ value in order to resume the normal operating mode of the converter 1000. Now that the negative current feedback of the feedback circuit 170 has been reestablished, the output current $I_{LOAD}$ will follow the current control voltage $V_{C\_BUFF}$, as shown in FIG. 12B. Accordingly, the error signal $V_{ERROR}$ will increase and the operating frequency $f_{op}$ will decrease, as shown in FIGS. 12C and 12D.

At time $t_7$, if the input voltage $V_{in}$ has returned to normal (e.g., the input voltage $V_{in}$ is normal or greater than the greater the minimum designated value $V_{in\_min}$), then the converter 1000 will resume normal operation. If the input voltage $V_{in}$ has still not recovered by time $t_7$, then the error signal $V_{ERROR}$ would reach the threshold voltage $V_{ERROR\_TH}$ again and the control sequence would repeat the time $t_2$ to time $t_7$ process again until the input voltage Vin recovers.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A resonant power converter, comprising:
   first and second switching elements coupled across a direct current (DC) power source;
   a resonant circuit coupled between an isolation transformer primary winding and an output node between the first and second switching elements;
   a current sensing circuit coupled in series with a load across a secondary winding of the isolation transformer and configured to provide a sensor output signal representative of an output current across the load;
   a feedback circuit configured to generate an error signal corresponding to a difference between the sensor output signal and a reference signal;
   a controller comprising a frequency control input terminal, and configured to generate drive signals to the first and second switching elements at a determined operating frequency;
   a frequency control circuit coupled between the feedback circuit and the frequency control input terminal of the controller, and configured, responsive to the error signal, to determine the operating frequency of the controller with respect to defined minimum and maximum frequencies; and
   a reference control circuit coupled between an output terminal of the feedback circuit and a reference signal input of the feedback circuit, the reference control circuit configured to sense when the error signal exceeds a threshold value, and in response to control the reference signal wherein the error signal is reset to a value below the threshold value.

2. The resonant power converter of claim 1, wherein:
   the controller comprising the frequency control input terminal is a first controller;
   the reference control circuit includes a resistor, a capacitor, and a second controller; and
   the error signal is fed to the second controller for monitoring through the resistor and is filtered by the capacitor.

3. The resonant power converter of claim 2, wherein:
   the resistor is coupled between the output terminal of the feedback circuit and an input of the second controller;
   the capacitor is coupled between the input of the second controller and a ground reference; and
   an output of the second controller is coupled to the reference signal input of the feedback circuit.

4. The resonant power converter of claim 2, wherein:
   the second controller is confirmed to wait for a first time period after sensing the error signal exceed the threshold value prior to controlling the reference signal; and
   the first controller stabilizes at a minimum operating frequency during the first time period.

5. The resonant power converter of claim 2, wherein:
   the second controller is configured to reduce the reference signal until the error signal is less than the threshold value and hold the reference signal at a corresponding reduced value for a second time period prior to increasing the reference signal back to an initial value.

6. The resonant power converter of claim 1, wherein:
   the error signal being less than the threshold value corresponds to an input voltage of the DC power source being normal, and
   the error signal being greater than or equal to the threshold value corresponds to a drop in the input voltage, the drop being large enough the cause the operating frequency of the first controller to be less than a resonant frequency of the first controller.

7. A method for a resonant power converter to recover from a frequency-clamp mode initiated by a temporary input voltage drop, the method comprising:
   monitoring an error signal at an output of a feedback circuit of the resonant power converter;
   sensing when the error signal exceeds a threshold value associated with the temporary input voltage drop; and
   controlling a reference signal at an input of the feedback circuit in order to decrease the error signal below the threshold value.

8. The method of claim 7, further comprising:
   waiting for a first time period after the sensing that the error signal exceeds the threshold value prior to controlling the reference signal; and
   stabilizing the resonant power converter at a minimum frequency during the first time period.

9. The method of claim 7, wherein the step of controlling a reference signal at an input of the feedback circuit in order to decrease the error signal below the threshold value further comprises:
   reducing the reference signal until the error signal is less than the threshold value.

10. The method of claim 9, further comprising:
    maintaining the reference signal at a reduced value associated with the error signal being less than the threshold value for a second time period; and
    increasing the reference signal to an initial setpoint following the second time period.

11. The method of claim 7, further comprising:
    repeating each of the steps until the input voltage increases back to a normal value.

12. The method of claim 7, wherein the step of monitoring an error signal at an output of a feedback circuit of the resonant power converter further comprises:
    ignoring the error signal during a startup sequence of the resonant power converter.

13. The method of claim 7, further comprising:
    selecting the threshold value less than a maximum saturated value associated with the feedback circuit and greater than a steady state error signal associated with a normal operating mode.

14. The method of claim 7, wherein the step of sensing when the error signal exceeds a threshold value associated with the temporary input voltage drop further comprises:
    transitioning the resonant power converter into a frequency-clamped mode.

15. The method of claim 14, wherein the step of controlling a reference signal at an input of the feedback circuit in order to decrease the error signal below the threshold value further comprises:
    transitioning the resonant power converter back to a normal operating mode from the frequency-clamped mode.

16. An LED driver comprising:
    a DC-DC converter comprising a plurality of switching elements configured to produce an output voltage across first and second output terminals, based at least partially on an input voltage and a controlled operating frequency;

current sensing means for providing output signals corresponding to the output voltage;

a negative feedback control means for regulating the operating frequency based on an error signal derived at least in part from the output signals relative to a reference signal; and a reference control means for resetting the error signal following a temporary drop in the input voltage that causes the error signal to exceed a threshold value.

17. The LED driver of claim 16, wherein:

the temporary drop in the input voltage is sufficiently large to transition the DC-DC converter from a normal operating mode into a frequency-clamped mode; and the frequency-clamped mode is associated with the operating frequency dropping below a resonant frequency of the DC-DC converter.

18. The LED driver of claim 17, wherein:

resetting the error signal following the temporary drop in the input voltage transitions the DC-DC converter from the frequency-clamped mode back into the normal operating mode be reducing the error signal below the threshold value.

19. The LED driver of claim 16, wherein:

resetting the error signal following the temporary drop in the input voltage includes controlling the reference signal in order to reduce the error signal.

\* \* \* \* \*